United States Patent
Hinson et al.

(10) Patent No.: US 12,466,244 B2
(45) Date of Patent: Nov. 11, 2025

(54) BARRIER MOVEMENT ASSIST SYSTEM AND METHOD OF USE

(71) Applicant: RCR Enterprises, LLC, Welcome, NC (US)

(72) Inventors: Benjamin Lynn Hinson, Kannapolis, NC (US); Mitchell Ryan Fenton, Winston-Salem, NC (US); Bryan Glenn Childress, Lexington, NC (US)

(73) Assignee: RCR ENTERPRISES, LLC, Welcome, NC (US)

( * ) Notice: Subject to any disclaimer, the term of this patent is extended or adjusted under 35 U.S.C. 154(b) by 0 days.

(21) Appl. No.: 18/537,925

(22) Filed: Dec. 13, 2023

(65) Prior Publication Data
US 2024/0190219 A1    Jun. 13, 2024

Related U.S. Application Data

(60) Provisional application No. 63/432,290, filed on Dec. 13, 2022.

(51) Int. Cl.
| | |
|---|---|
| *B60J 1/17* | (2006.01) |
| *B60R 21/12* | (2006.01) |
| *E06B 5/12* | (2006.01) |
| *E05F 15/689* | (2015.01) |

(52) U.S. Cl.
CPC .............. *B60J 1/17* (2013.01); *B60R 21/12* (2013.01); *E06B 5/12* (2013.01); *E05F 15/6907* (2024.01)

(58) Field of Classification Search
CPC ....... B60J 1/17; E05F 15/5909; E05F 11/483; B60R 21/12; F41H 5/263; F41H 5/26; E06B 5/12
See application file for complete search history.

(56) References Cited

U.S. PATENT DOCUMENTS

| | | | | |
|---|---|---|---|---|
| 4,428,542 A | * | 1/1984 | Kobayashi ............ | E05F 11/483 74/505 |
| 7,797,882 B2 | * | 9/2010 | Lubaway ............... | E05F 11/445 49/352 |
| 10,647,182 B2 | * | 5/2020 | Farhadi ................... | E05B 85/00 |

FOREIGN PATENT DOCUMENTS

DE      102004004380 A1 *  8/2005  ............ E05F 11/483

OTHER PUBLICATIONS

DE102004004380A1 English translation from WIPO (Year: 2005).*

* cited by examiner

*Primary Examiner* — Daniel J Troy
*Assistant Examiner* — Susan M. Heschel
(74) *Attorney, Agent, or Firm* — Moore & Van Allen PLLC

(57) ABSTRACT

A barrier movement assist system aids in the moving of a barrier, the barrier assist system comprising one or more support members; one or more assist devices operatively coupled to the one or more support members, wherein an assist device comprises: a rotational member; and a flexible member operatively coupled to the rotational member and operatively coupled to the barrier; wherein the barrier assist system is configured to aid in opening or closing of the barrier within a frame. A drive system is configured to open and close the barrier, wherein the barrier assist system is configured to aid in the opening or the closing of the barrier. The barrier assist system is configured to reduce an opening speed, reduce an opening acceleration, or increase an opening resistance of the barrier, and is configured to reduce a closing force at which the drive system is configured to close the barrier.

16 Claims, 23 Drawing Sheets

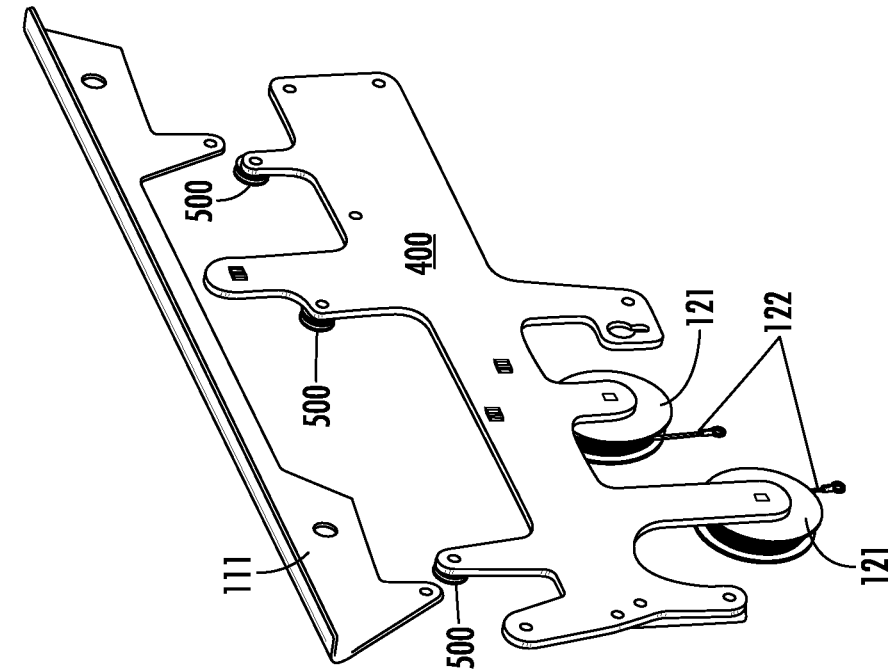
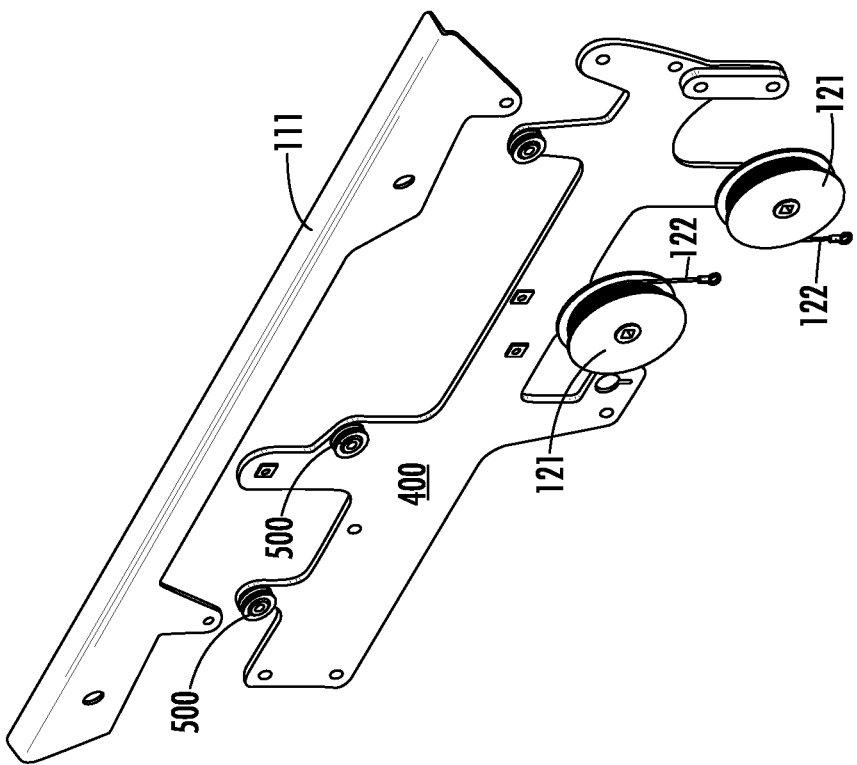
FIG. 14

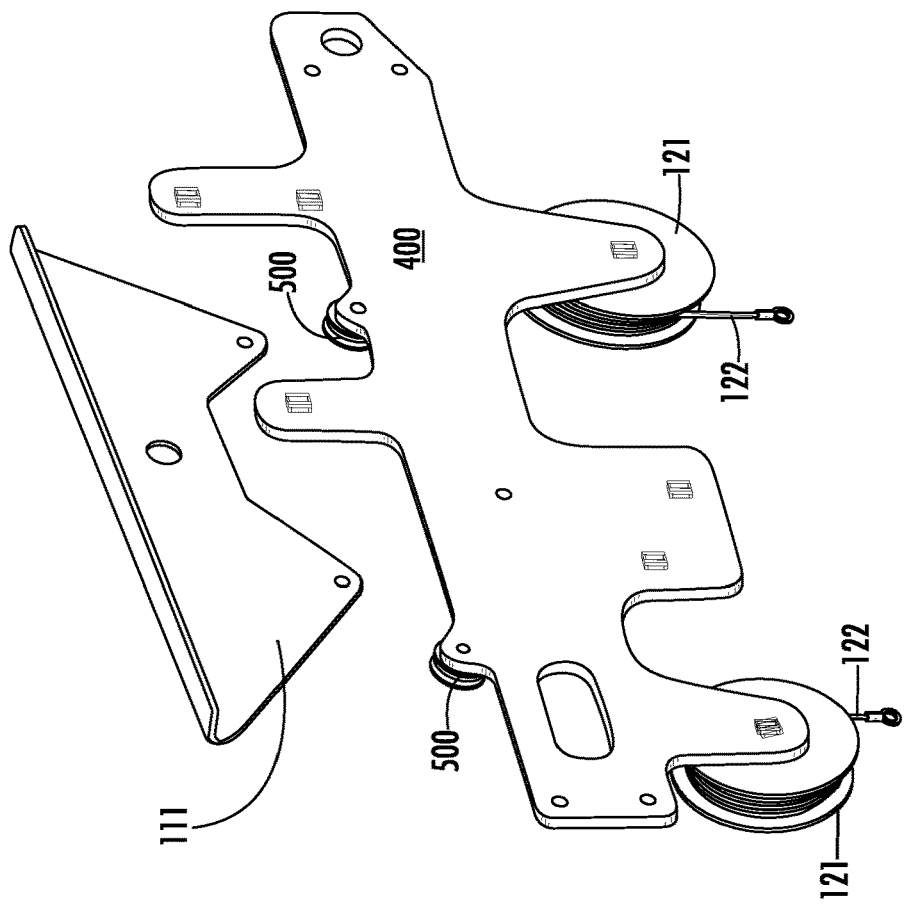
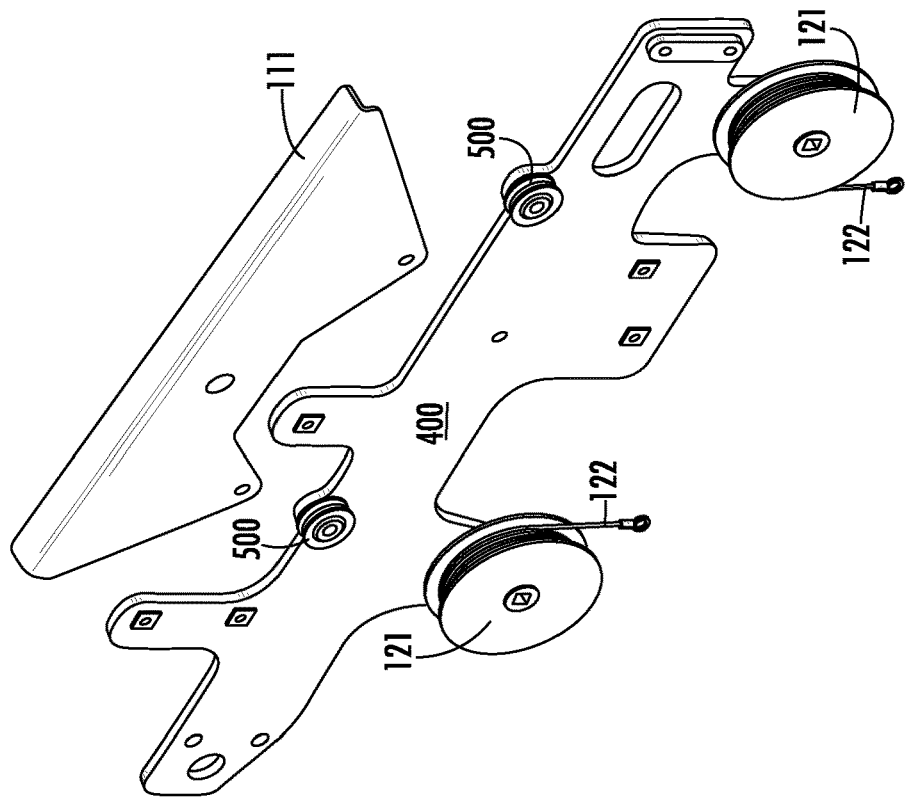
FIG. 15

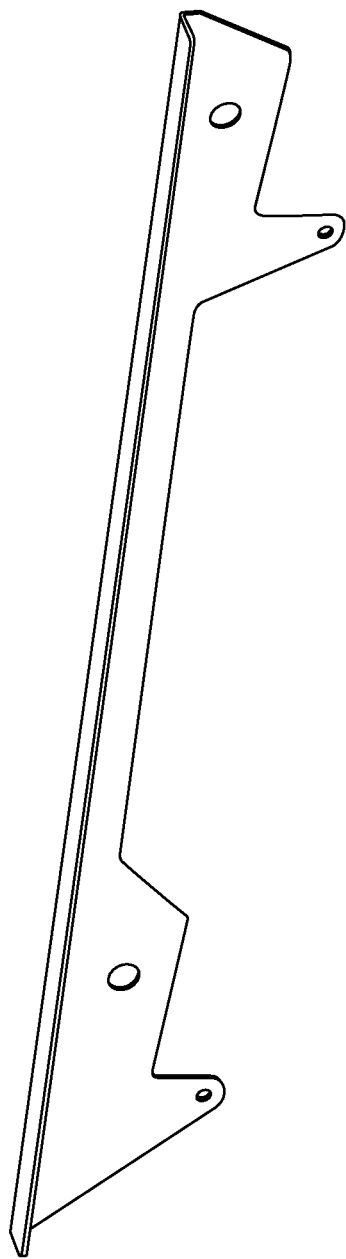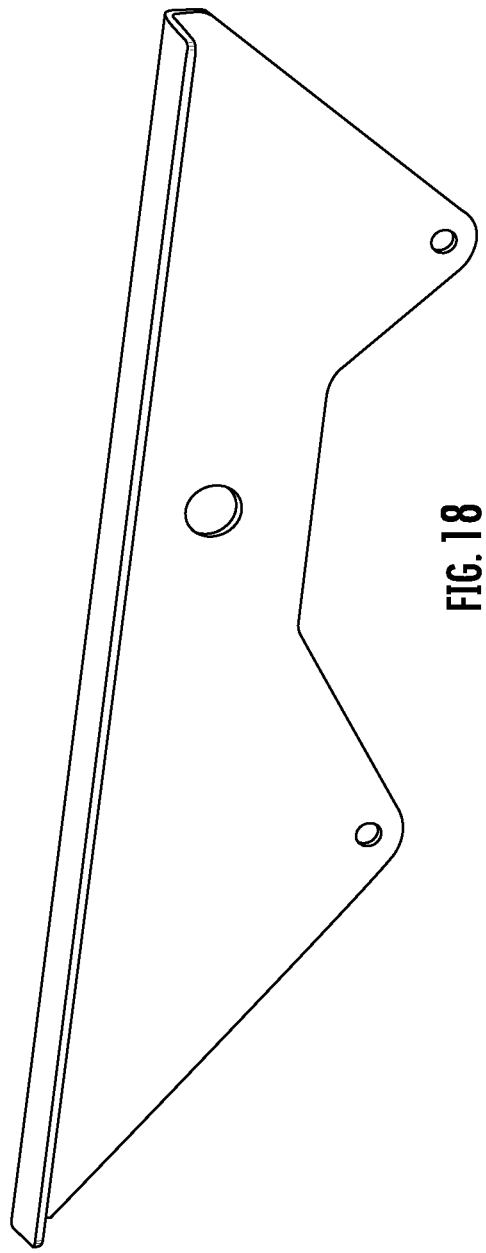

BARRIER MOVEMENT ASSIST SYSTEM AND METHOD OF USE

FIELD

The present invention relates to a barrier assist system, and more particularly, to utilizing at least one assist device to aid in moving (e.g., opening or closing) of the barrier.

BACKGROUND

Barrier assist systems may include systems that aid in the moving (e.g., opening or closing) of a barrier. A barrier assist system is a system that is able to aid a conventional drive system in the movement (e.g., opening and closing) of a barrier. Additionally, or alternatively, the barrier assist system may comprise one or more assist devices configured to aid in reducing binding of the barrier within the frame during opening and closing.

SUMMARY

As will be described herein, the barrier assist system is configured to aid in moving (e.g., opening, closing, or the like) of a barrier. The barrier system may comprise one or more support members and one or more assist devices operatively coupled to the one or more support members. The vehicle barrier system may comprise a barrier, a frame, a drive system, and one or more barrier systems. Generally, the barrier assist system may comprise one or more support members and one or more assist devices wherein the barrier assist system may be configured to aid in moving (e.g., opening, closing, or the like) of the barrier within a frame. In some embodiments, a drive system may be configured to move the barrier, wherein the barrier assist system may be configured to aid in the moving the barrier. In some embodiments, the assist device may comprise a rotational member and a flexible member operatively coupled to the rotation member and operatively coupled to the barrier. In some embodiments, the rotational member may comprise a spring-loaded pully, and the flexible member may comprise a wire.

In some embodiments, the barrier assist system may be configured to aid in moving a barrier, the barrier assist system comprising one or more support members configured to be operatively coupled to the barrier and one or more assist devices configured to be operatively coupled to the one or more support members and a frame. In some embodiments the assist device may comprise a rotational member; and a flexible member operatively coupled to the rotational member and operatively coupled to the barrier. In some embodiments, the barrier assist system may be configured to aid in opening or closing of the barrier within the frame.

In some embodiments, a drive system may be configured to open and close the barrier, wherein the barrier assist system may be configured to aid in the opening or the closing of the barrier.

In some embodiments, the barrier assist system may be configured to reduce an opening speed, reduce an opening acceleration, or increase an opening resistance of the barrier, and may be configured to reduce a closing force at which the drive system is configured to close the barrier.

In some embodiments, the rotational member comprises a spring-loaded pully, and wherein the flexible member comprises a wire.

In some embodiments, the one or more assist devices further comprise one or more guides configured to be operatively coupled to the frame, wherein the flexible member may be configured to be operatively coupled to one or more guides.

In some embodiments, the one or more guides comprises a rotational guide member.

In some embodiments, the flexible member may be configured to be unwound from the rotational member when the barrier is lowered; and the flexible member may be configured to be wound around the rotational member when the barrier is raised.

In some embodiments, the one or more assist devices comprise a first assist device and a second assist device. In some embodiments, the first assist device and the second assist device may be configured to aid in reducing binding of the barrier within the frame during opening and closing.

In some embodiments, the barrier may be a window, and wherein the window and the frame may be within a vehicle.

In some embodiments, the drive system may be a motor configured to open a standard window.

In some embodiments, the one or more support members comprise a barrier support member, wherein the barrier support member may be operatively coupled to the window.

In some embodiments, the window may be a forced entry or blast resistant window configured to provide at least UL level 1 protection or greater, and wherein the drive system alone may be unable to close the window without the barrier assist system.

In another embodiment, a vehicle barrier system may comprise a barrier; a frame, wherein the barrier may be configured to open and close within the frame; a drive system operatively coupled to the frame and the barrier and configured to open and close the barrier; and one or more barrier assist systems operatively coupled to the barrier and the frame, and configured to aid in opening or closing of the barrier within the frame.

In some embodiments, a barrier assist system of the one or more barrier assist systems comprise one or more support members operatively coupled to the barrier; and one or more assist devices operatively coupled to the one or more support members and the frame. In some embodiments, the assist device comprises a rotational member, and a flexible member operatively coupled to the rotational member and operatively coupled to the barrier.

In some embodiments, the rotational member comprises a spring-loaded pully, and wherein the flexible member comprises a wire.

In some embodiments, the flexible member may be configured to be unwound from the rotational member when the barrier is lowered; and the flexible member may be configured to be wound around the rotational member when the barrier is raised.

In some embodiments, the one or more assist devices comprise a first assist device, and a second assist device. In some embodiments, the first assist device and the second assist device may be configured to aid in reducing binding of the barrier within the frame during opening and closing.

In some embodiments, the barrier may be a window, and wherein the window is a forced entry or blast resistant window configured to provide at least UL level 1 protection or greater, and wherein the drive system alone is unable to close the window without the barrier assist system.

In some embodiments, the one or more barrier assist systems may be configured to reduce an opening speed, reduce an opening acceleration, or increase an opening resistance of the barrier, and may be configured to reduce a closing force at which the drive system is configured to close the barrier.

In yet another embodiment, a method of opening and closing a barrier using one or more assist devices comprising a rotational member, and a flexible member operatively coupled to the rotational member and operatively coupled to the barrier. In some embodiments, the method comprises opening the barrier using a drive system operatively coupled to a frame and the barrier, wherein the one or more assist devices reduce an opening speed, reduce an opening acceleration, or increase an opening resistance of the barrier. In some embodiments, the method comprises closing the barrier using the drive system, wherein the one or more assist devices reduce a closing force at which the drive system is configured to close the barrier.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The accompanying drawings illustrate some of the embodiments of the invention and are not necessarily drawn to scale, wherein:

FIG. 14 is a perspective view of a front barrier assist system as an assembly, in accordance with some embodiments of the present disclosure.

FIG. 15 is a perspective view of a rear barrier assist system as an assembly, in accordance with some embodiments of the present disclosure.

FIG. 17 is a perspective view of a front barrier support member, in accordance with some embodiments of the present disclosure.

FIG. 18 is a perspective view of a rear barrier support member, in accordance with some embodiments of the present disclosure.

DETAILED DESCRIPTION

Figure 1:
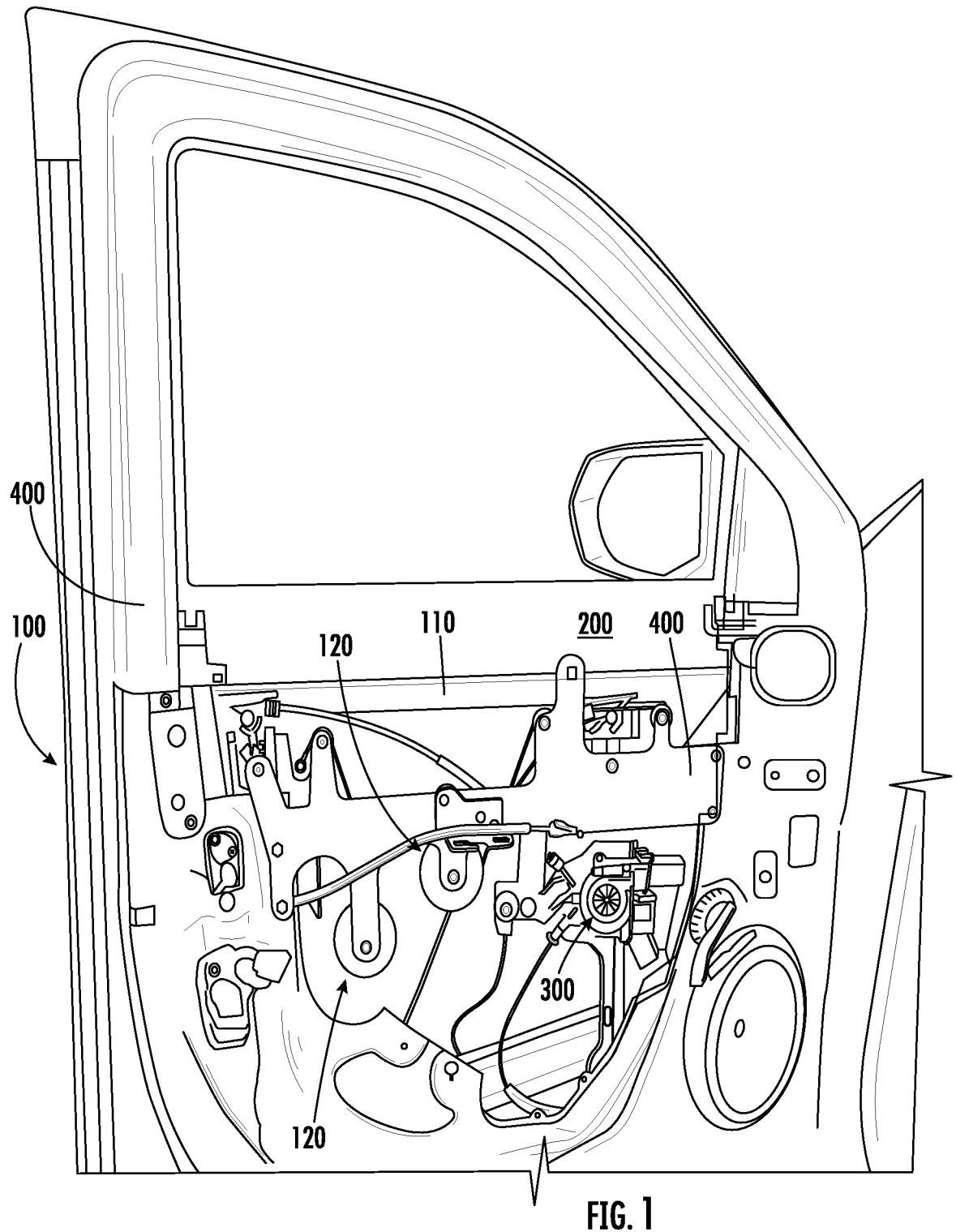
FIG. 1 is a front view of the barrier assist system installed on a frame, in accordance with some embodiments of the present disclosure.
Figure 2:
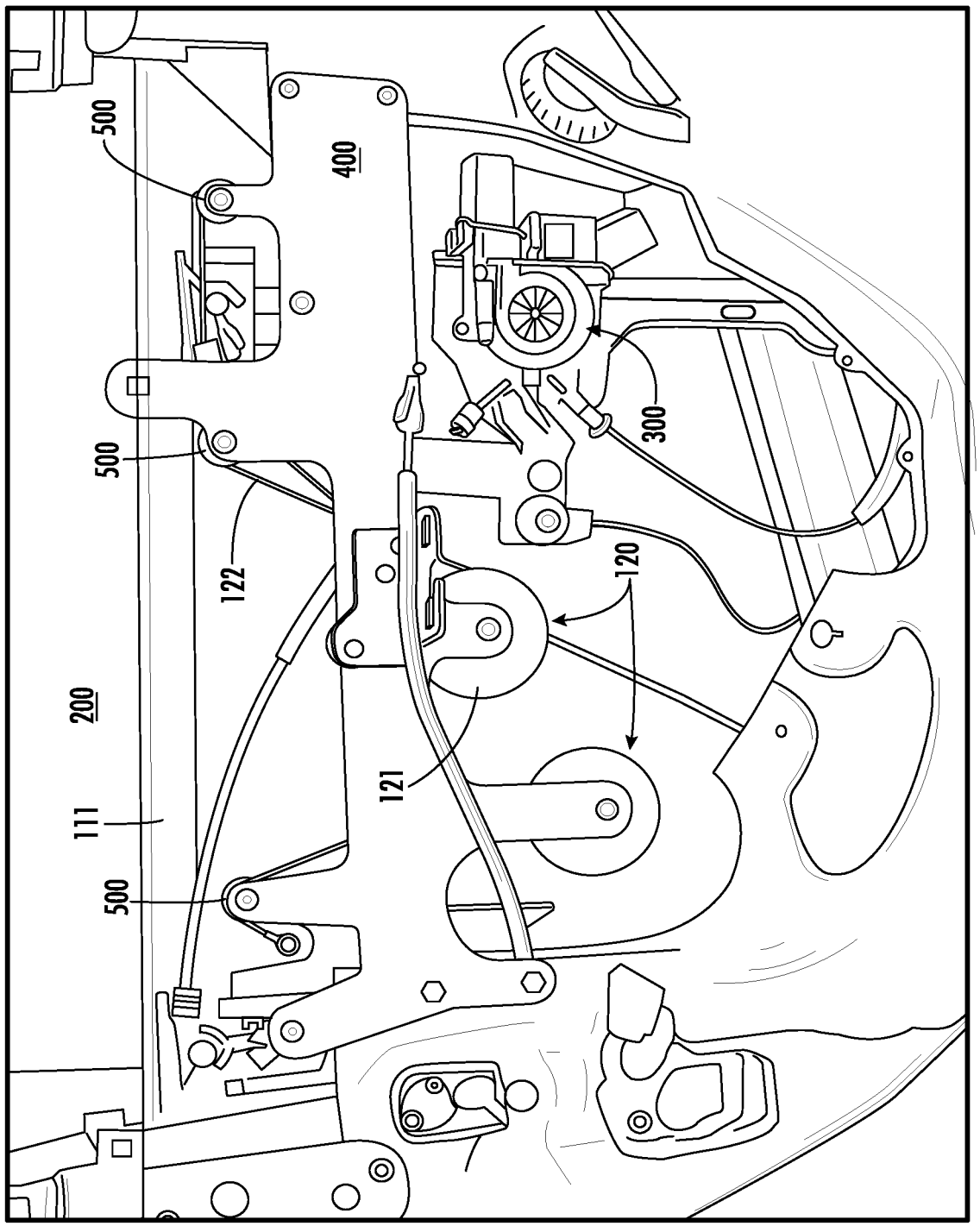
FIG. 2 is an enlarged front view of the barrier assist system of FIG. 1, in accordance with some embodiments of the present disclosure.
Figure 3:
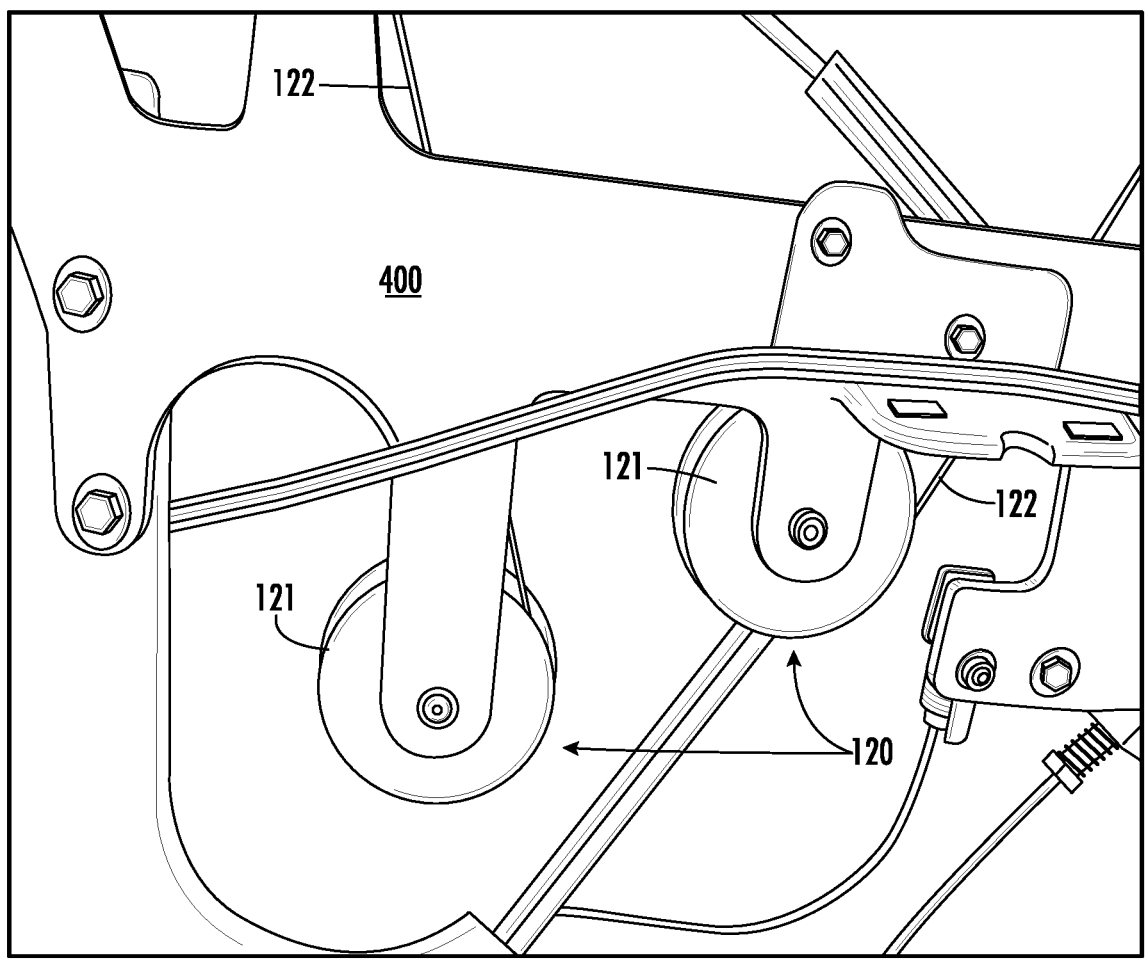
FIG. 3 is a front view of the one or more assist devices of the barrier assist system, in accordance with some embodiments of the present disclosure.
Figure 4:
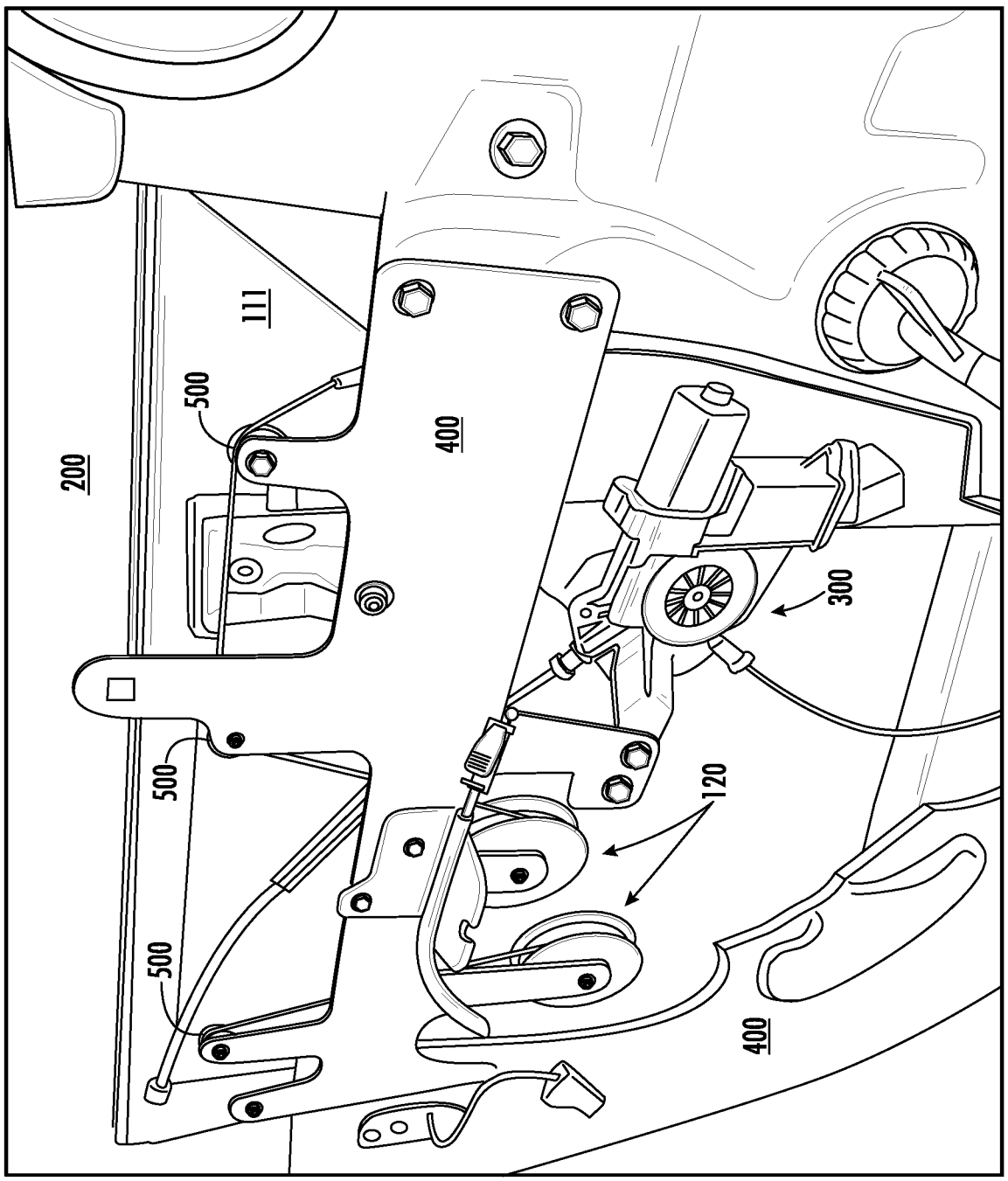
FIG. 4 is a perspective view of the barrier assist system of FIG. 1, in accordance with some embodiments of the present disclosure.
Figure 5:
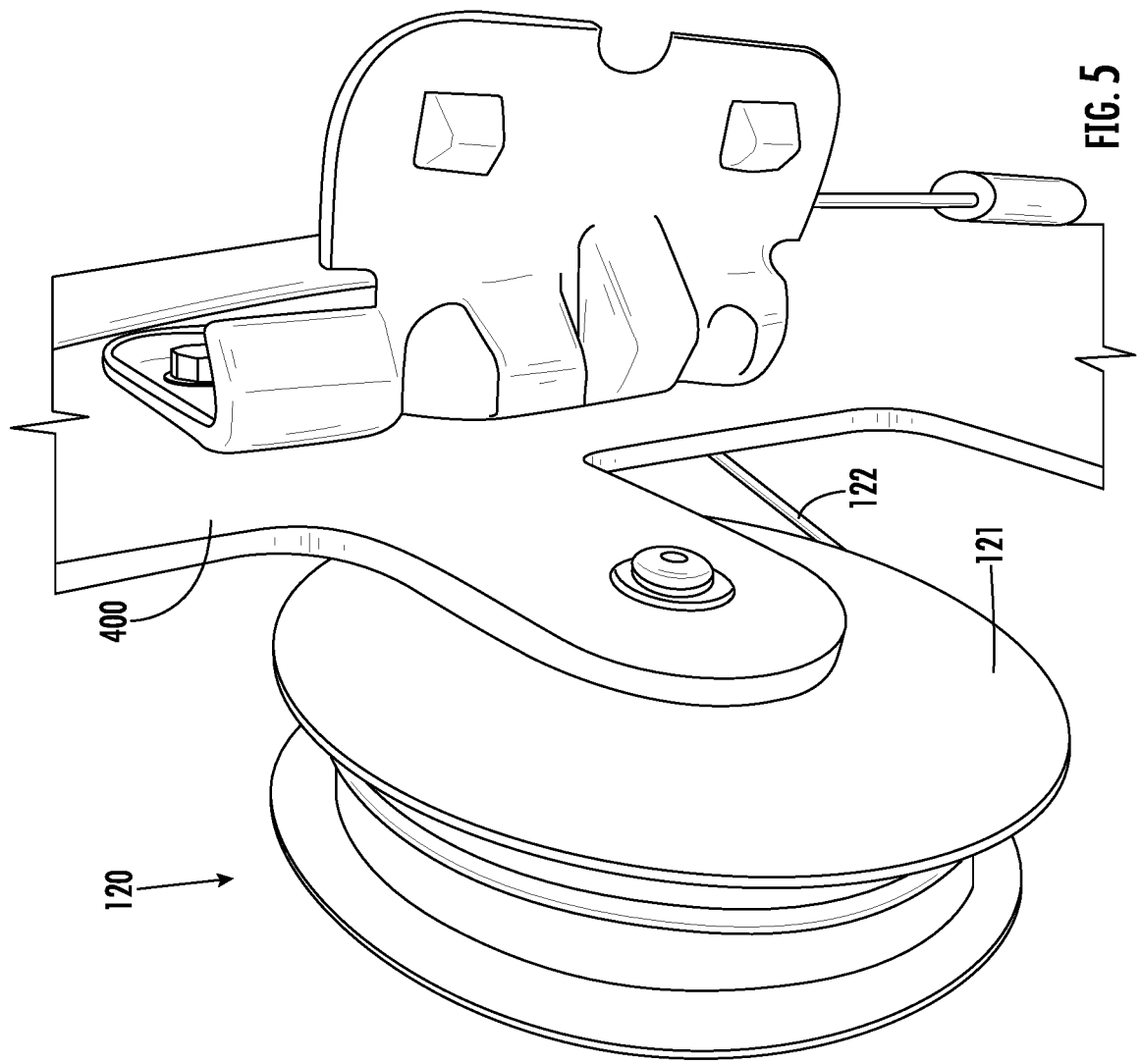
FIG. 5 is a perspective enlarged view of the one or more assist devices of the barrier assist system, in accordance with some embodiments of the present disclosure.
Figure 6:
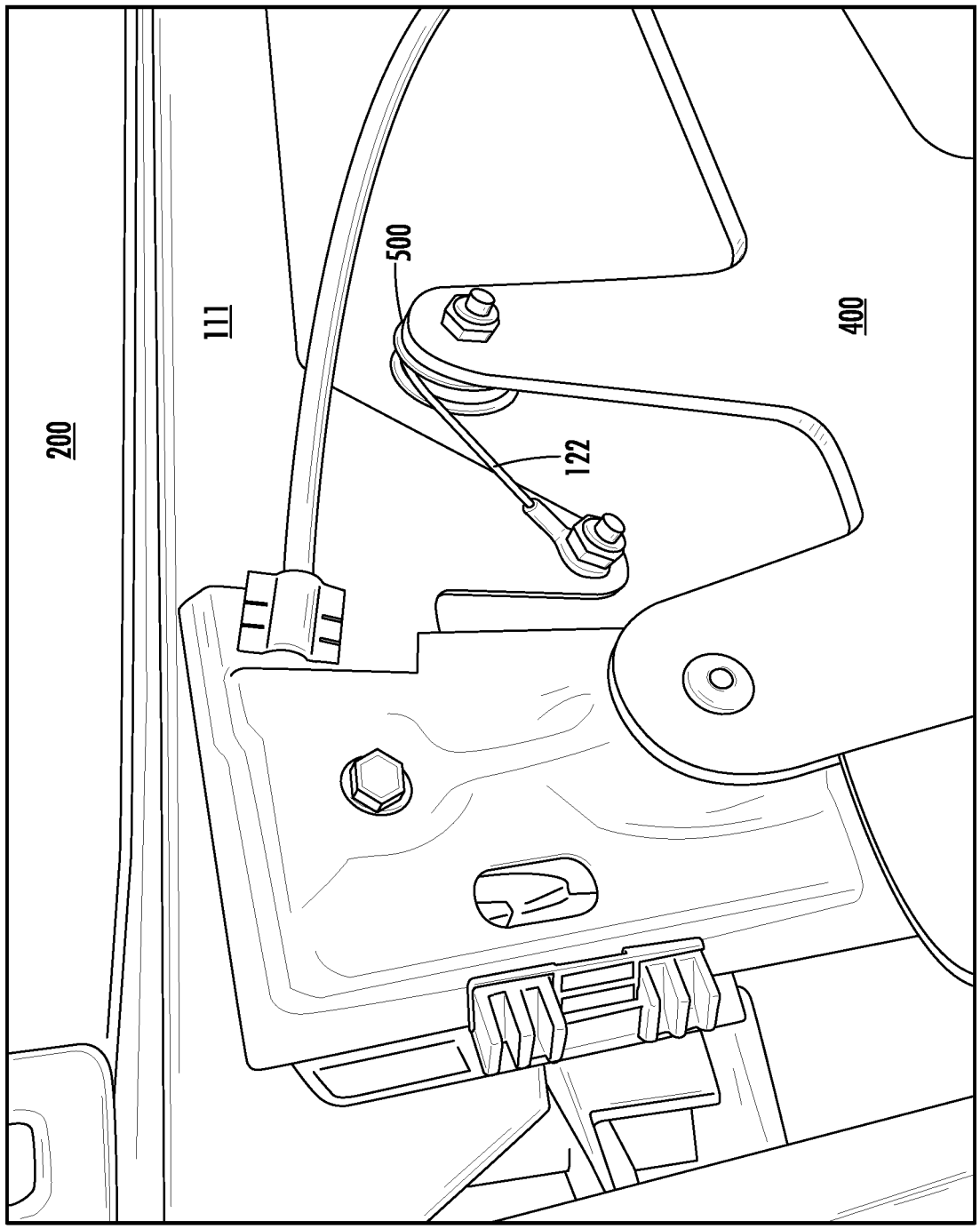
FIG. 6 is an enlarged front view of the one or more flexible members and the one or more guides, in accordance with some embodiments of the present disclosure.
Figure 7:
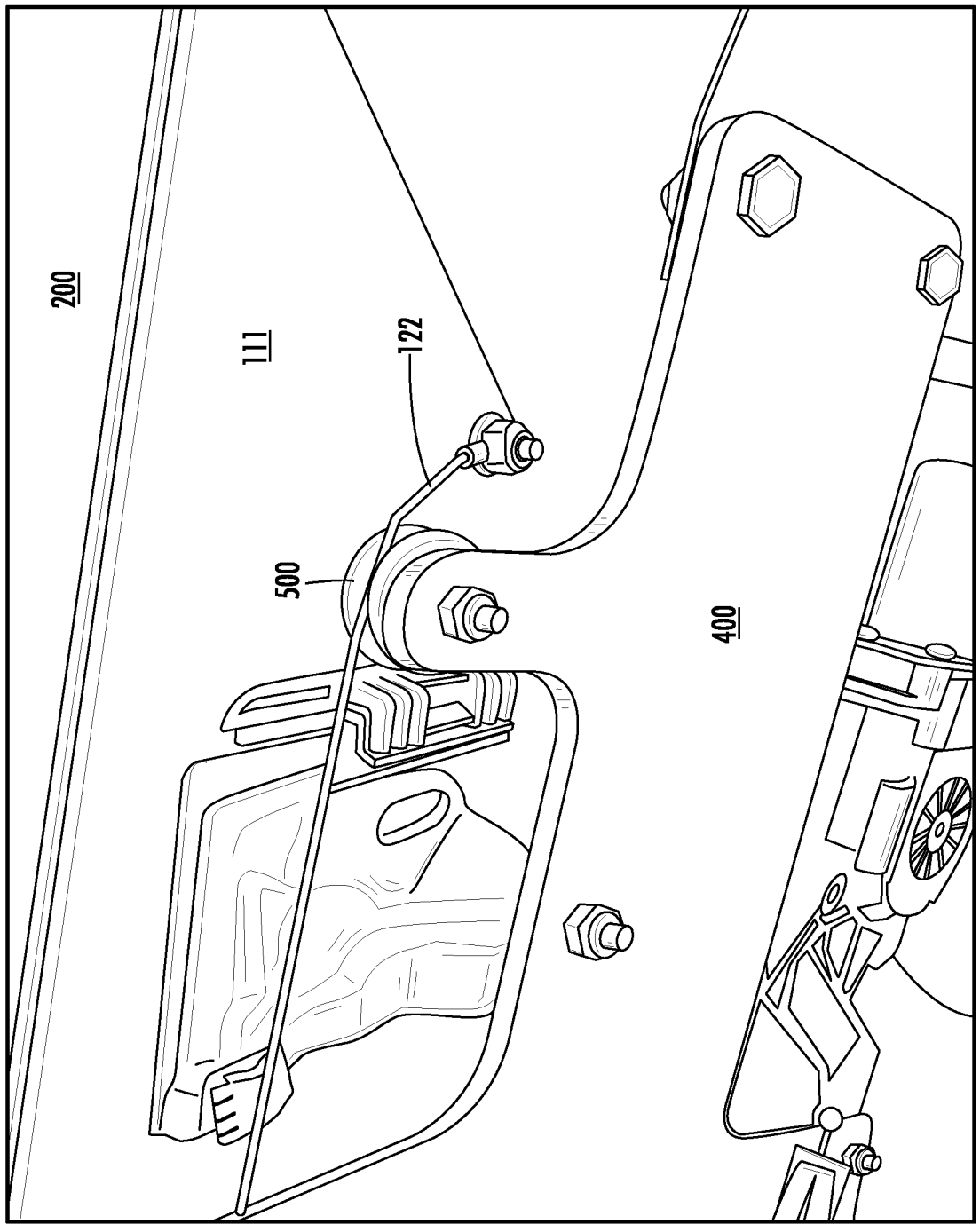
FIG. 7 is a perspective view of the one or more flexible members and the one or more guides, in accordance with some embodiments of the present disclosure.
Figure 8:
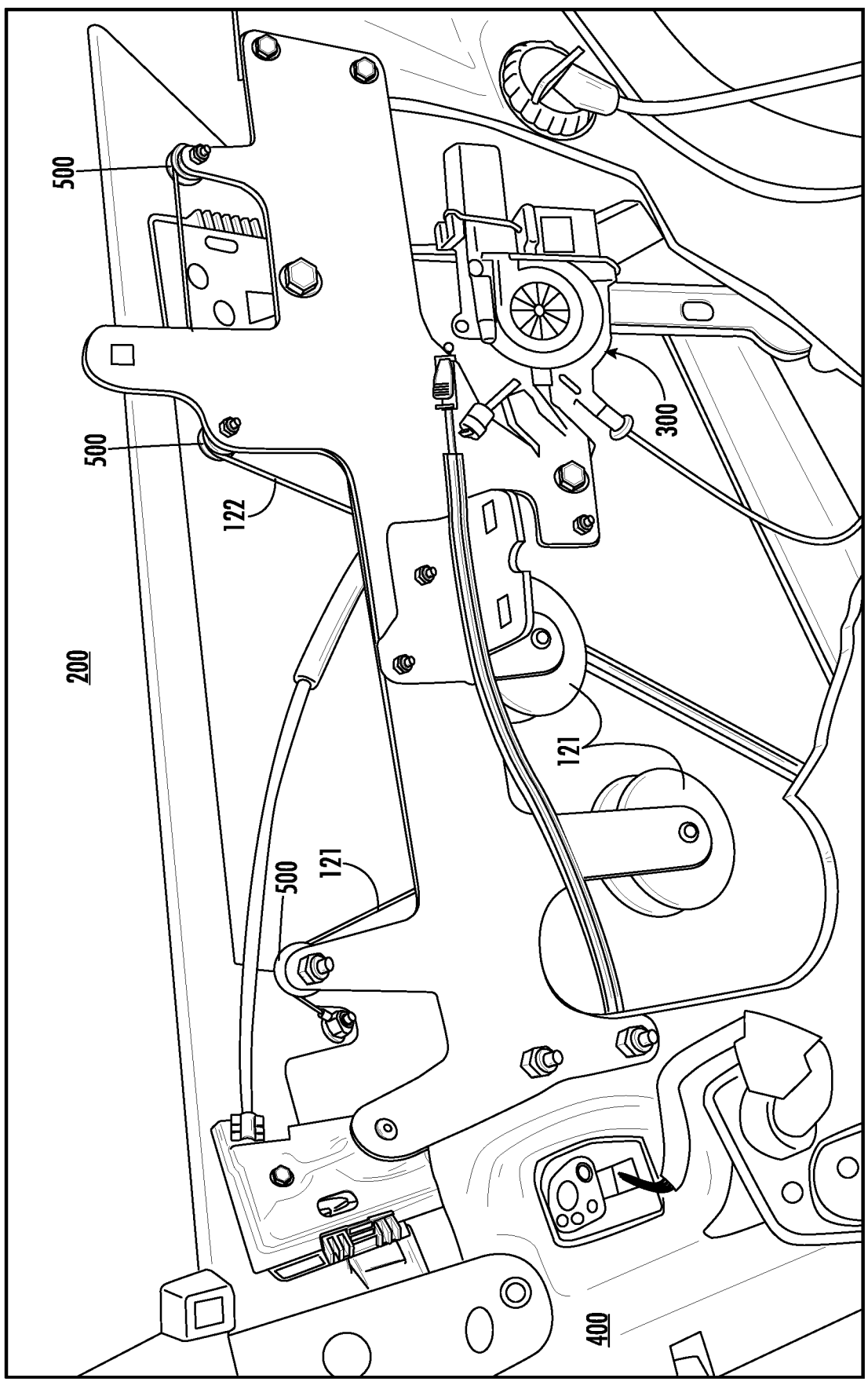
FIG. 8 is a perspective view of the barrier assist system, in accordance with some embodiments of the present disclosure.
Figure 9:
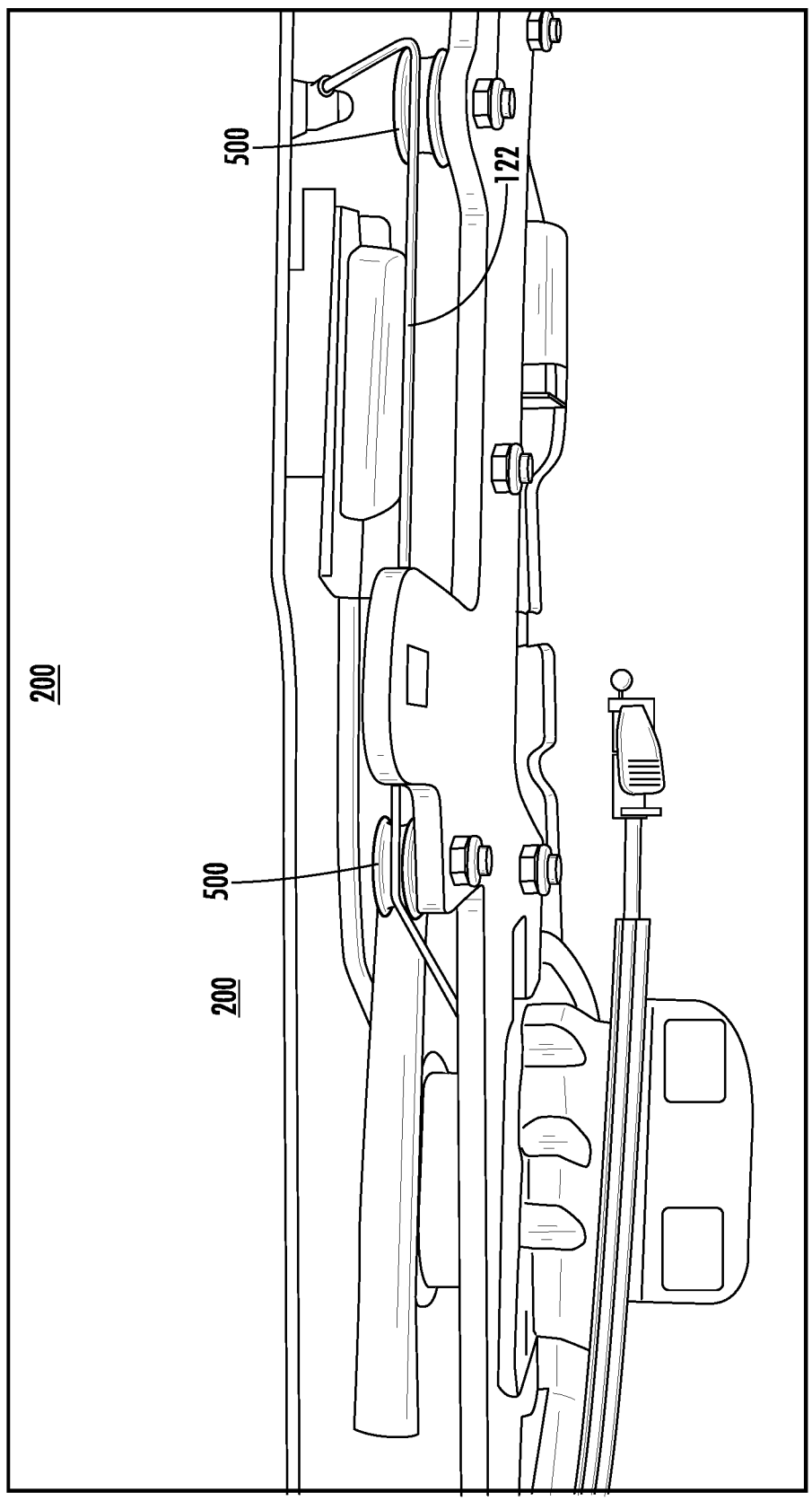
FIG. 9 is an enlarged top view of the one or more flexible members and the one or more guides, in accordance with some embodiments of the present disclosure.
Figure 10:
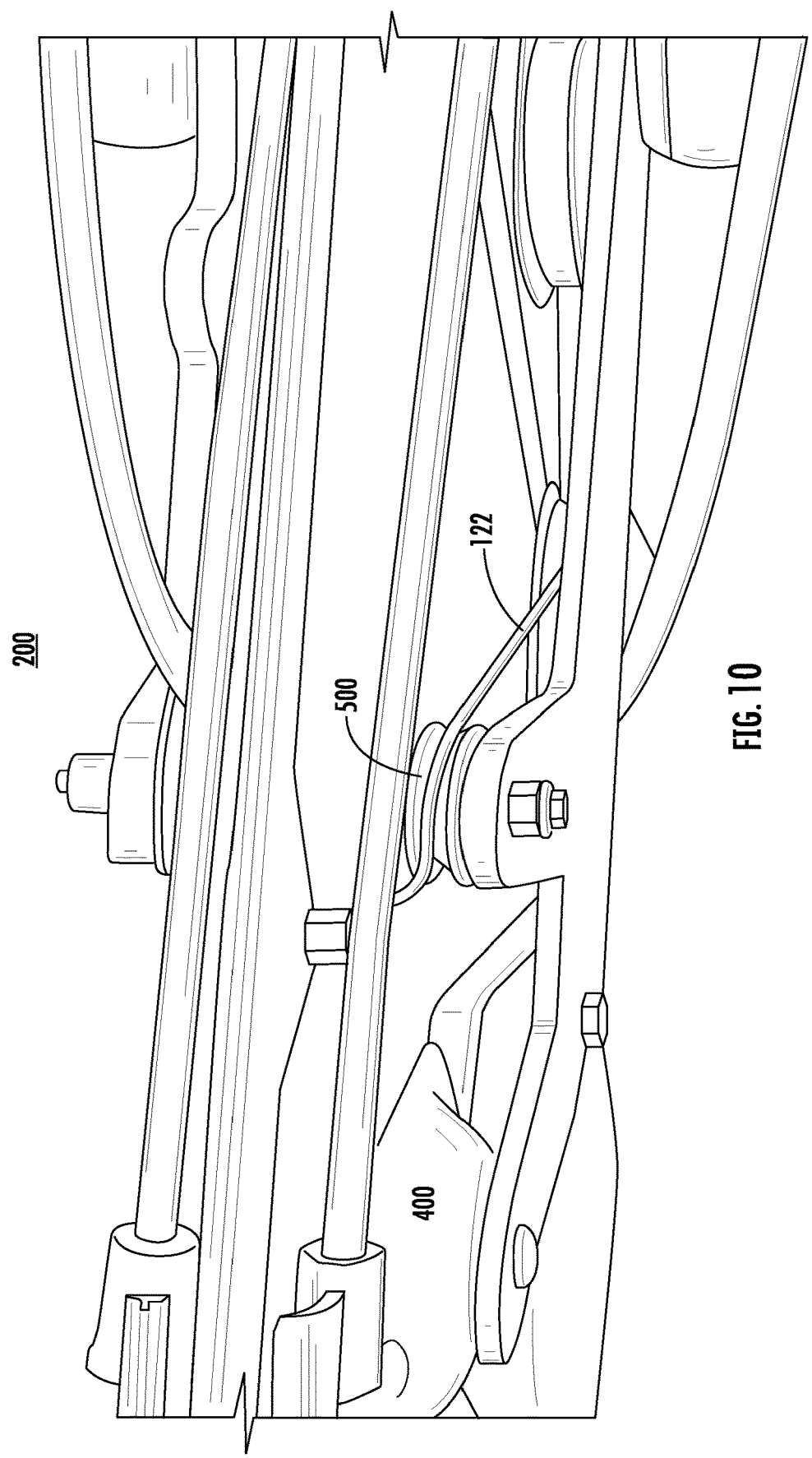
FIG. 10 is an enlarged top view of the one or more flexible members and the one or more guides, in accordance with some embodiments of the invention.
Figure 11:
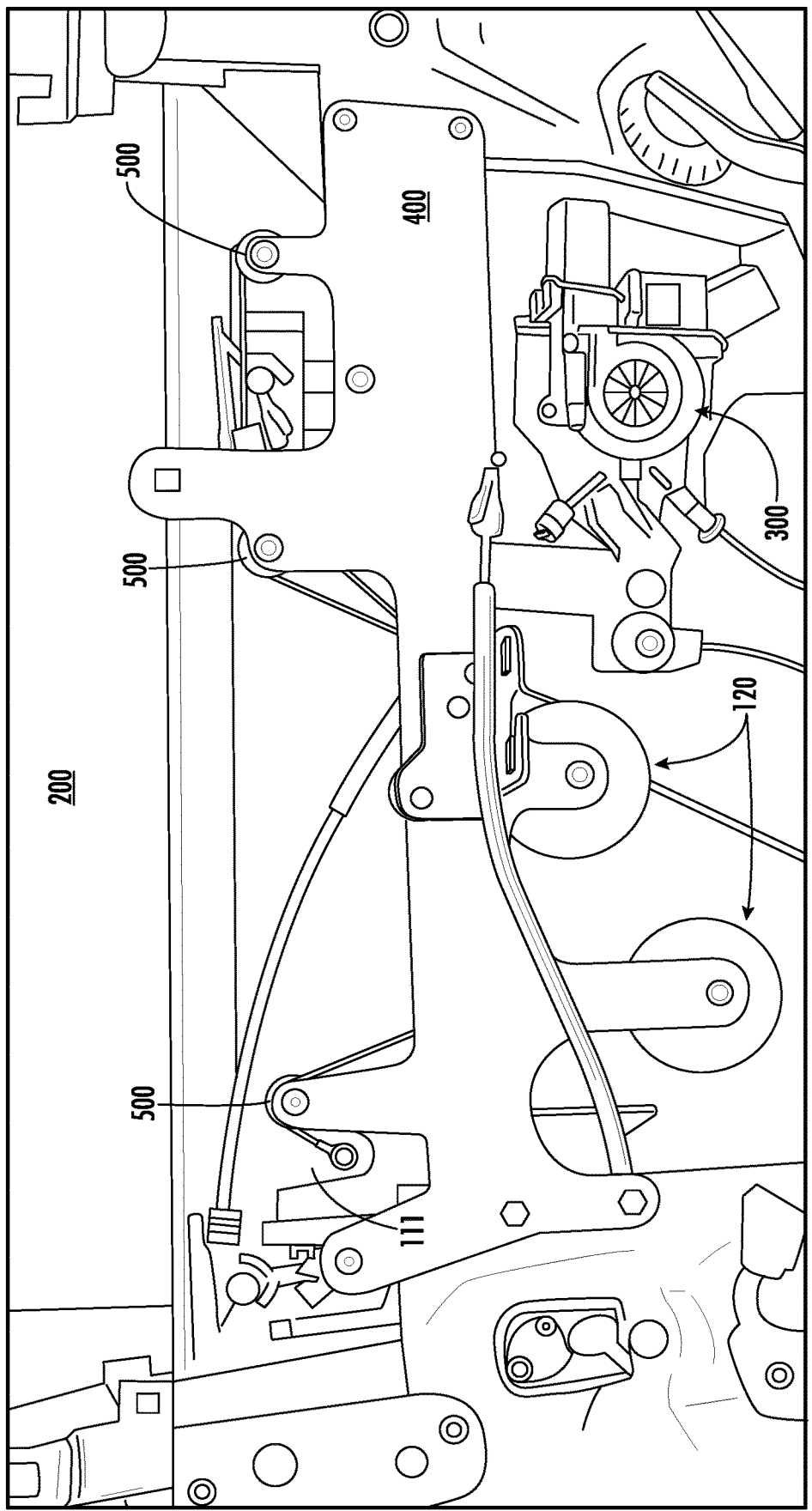
FIG. 11 is a front view of the barrier assist system in operation where the barrier is in a closed position, in accordance with some embodiments of the present disclosure.
Figure 12:
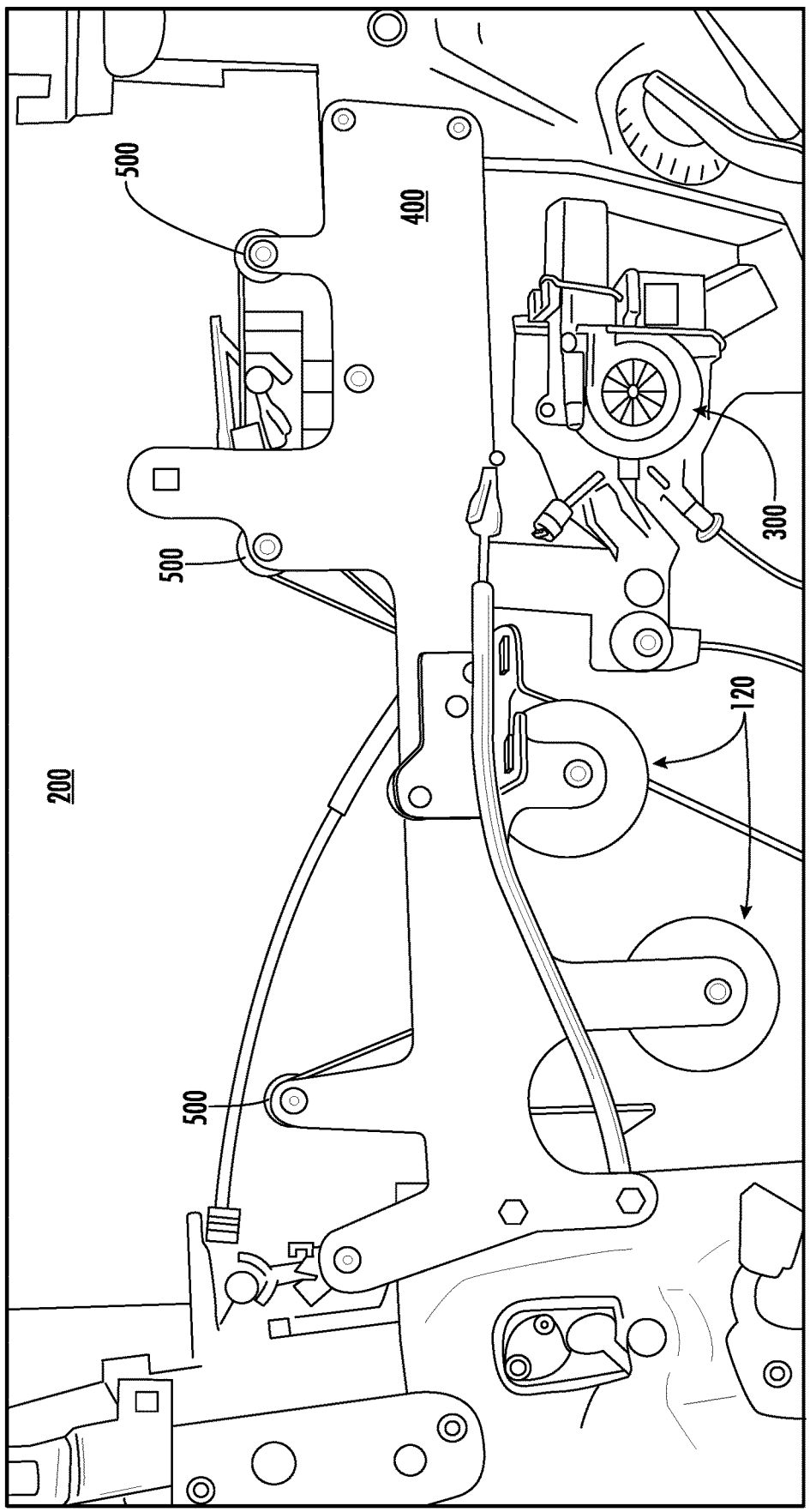
FIG. 12 is a front view of the barrier assist system in operation where the barrier is between an open and a closed position, in accordance with some embodiments of the present disclosure.
Figure 13:
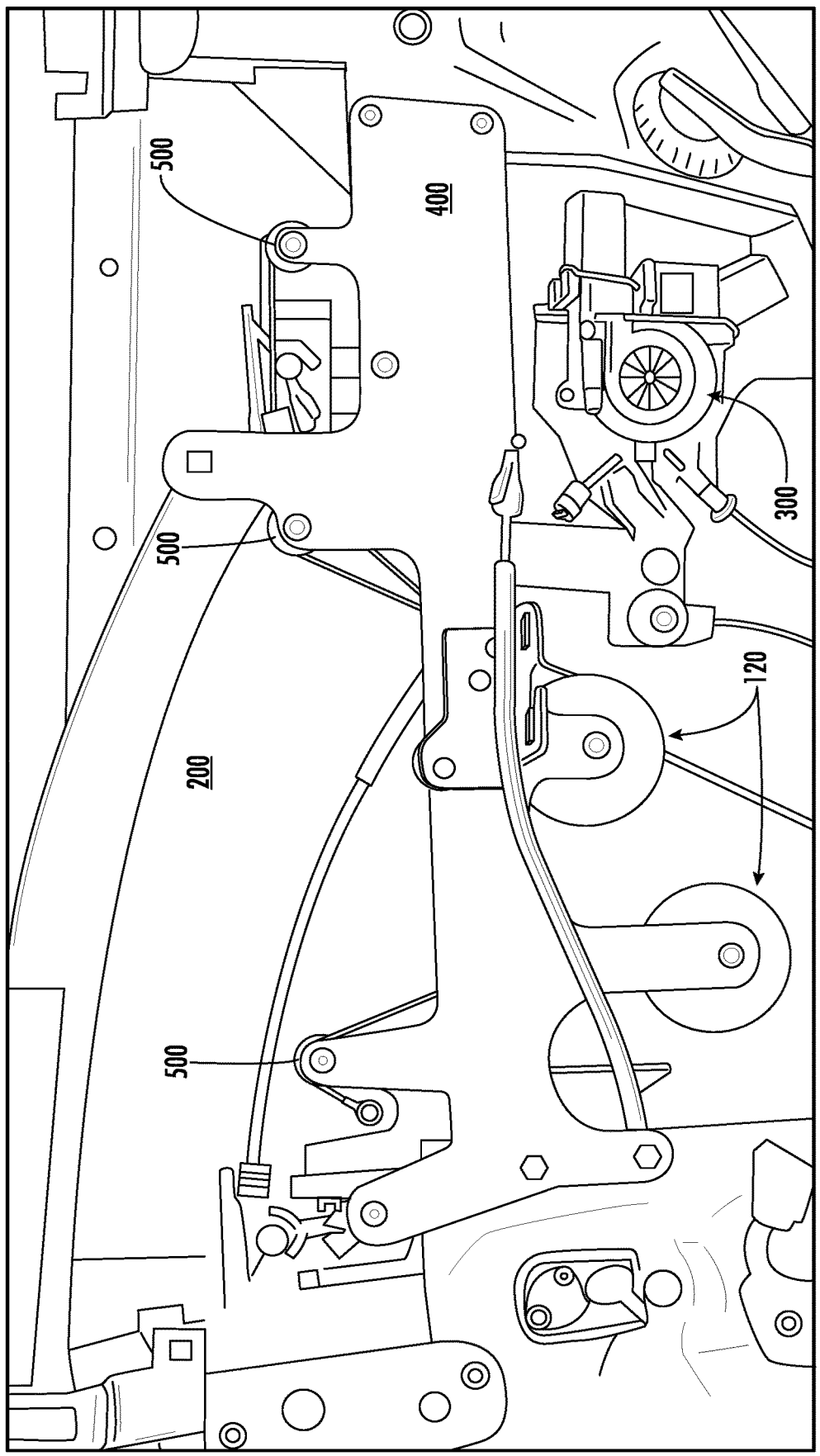
FIG. 13 is a front view of the barrier assist system in operation where the barrier is in an open position, in accordance with some embodiments of the present disclosure.

The following detailed description teaches specific example embodiments of the invention. Embodiments of the present disclosure will now be described more fully hereinafter with reference to the accompanying drawings, in which some, but not all, embodiments of the disclosure are shown. Other embodiments do not depart from the scope of the present invention. Indeed, the disclosure may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. Where possible, any terms expressed in the singular form herein are meant to also include the plural form and vice versa, unless explicitly stated otherwise. Also, as used herein, the singular forms "a", "an" and "the" are intended to include the plural forms as well and shall mean "one or more" even though the phrase "one or more" is also used herein, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof. Furthermore, when it is said herein that something is "based on" something else, it may be based on one or more other things as well. In other words, unless expressly indicated otherwise, as used herein "based on" means "based at least in part on" or "based at least partially on." It should be understood that the word "exemplary" is used herein to mean "serving as an example, instance, or illustration." Any implementation described herein as "exemplary" is not necessarily to be construed as advantageous over other implementations.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "upper," "lower," "left," "right," "horizontal," "vertical," "upward," and "downward" merely describe the configuration shown in the figures. The referenced components may be oriented in an orientation other than that shown in the drawings and the terminology, therefore, should be understood as encompassing such variations unless specified otherwise.

It will be understood that when an element is referred to as being "connected," "coupled," or "operatively coupled" to another element, the elements can be formed integrally with each other, or may be formed separately and put together. Furthermore, "connected," "coupled," or "operatively coupled" can mean the element is directly connected, coupled, or operatively coupled to the other element, or intervening elements may be present between the elements. Furthermore, "connected," "coupled," or operatively coupled" may mean that the elements are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

Conventional barrier movement systems face challenges that limit the ability to raise and lower the barrier in a fully opened position. Further, conventional systems limit the number of times a barrier may be moved into the open position. In this way, conventional barrier movement systems do not allow for barriers to be moved into a fully opened position while still maintaining adequate protection from projectiles. As will be described herein, there are difficulties associated with solving the issues of allowing a barrier to fully open for a repeated number of times without compromising the protection the barrier has to offer.

As illustrated by FIGS. 1-15 and 17-23, the barrier assist system 100 may be configured to aid in moving a barrier 200. It should be understood that the barrier assist system 100 may be used to move any type of barrier 200, however, in particular embodiments the figures illustrates the use of the barrier assist system 100 within a vehicle. For example, in particular embodiments the barrier assist system 100 may be used to allow for the use of an improved barrier that provides protection from projectiles. It should be understood that the barrier assist system 100 may be installed during original assembly of the vehicle; however, in particular embodiments the barrier assist system 100 may be used as a retrofit assembly since the original drive system 300 of the barrier is unable to effectively move an upgraded barrier 200 (e.g., that provides projectile resistance, or the like).

As will be described in further detail herein, the barrier assist system 100 may include one or more support members 110 that are used to support the barrier 200. The one or more support members 110 may be the original support members for the barrier or may be reconfigured or replaced based on the barrier assist system 100. The one or more support members 110 may be moved with respect to a frame 400 to allow the movement of the barrier 200. In some embodiments, the barrier assist system 100 may include one or more assist devices 120 operatively coupled to the one or more support members 110 and/or the frame 400. As will be described herein, the assist device 120 may include a rotational member 121, a flexible member 122, and/or the like. In some embodiments, rotational members 121 may be operatively coupled to the frame 400 and the flexible member 122 may be operatively coupled to the rotational member 121 and operatively coupled to the barrier 200 (directly or through the one or more support members 110). In some embodiments, the barrier assist system 100 may be configured to aid in opening or closing of the barrier 200 within a frame 400, as will be described in further detail herein.

In some embodiments, the barrier assist system 100 may be configured to reduce an opening speed, reduce an opening acceleration, and/or increase an opening resistance of the barrier 200. In some embodiments, reducing the opening speed, reducing an opening acceleration, and/or increasing an opening resistance of the barrier 200 may include the assist device 120 applying a force on the barrier 200. In some embodiments, the force applied by the assist device 120 to the barrier 200 may be any amount of force which may include a force less than the force the drive system 300 applies to the barrier 200, equal to the force the drive system 300 applies to the barrier, and/or greater than the force the drive system 300 applies to the barrier 200.

In some embodiments, the barrier 200 may be configured to move (e.g., open, close, or the like) within the frame 400 through the use of a drive system 300. The drive system 300 may be the conventional drive system that used to open an original barrier before the barrier is upgraded to an improved barrier that provides improved projectile resistance. As such, the drive system 300 may be operatively coupled to the barrier 200 and may be configured to move (e.g., open, close, or the like) the barrier 200. In some embodiments, the vehicle barrier system may include one or more barrier assist systems 100 configured to aid the drive system 300 in opening or closing of the barrier 200 within the frame 400.

As used herein, "closing" a barrier may include moving a barrier to a closed position. Closing a barrier may include moving the barrier in a direction, such as upward, downward, leftward, rightward, or a combination of the foregoing. In this way, a mention of a closing direction (e.g., upward, downward, leftward, and/or rightward) is meant for explanation purposes only and should not limit the present disclosure from operating in a similar fashion in any other direction. Similarly, "opening" a barrier may include moving a barrier to an open position, and may include moving the barrier in a direction, such as upward, downward, leftward, rightward, or a combination of the foregoing. In this way, a mention of an opening direction (e.g., upward, downward, leftward, and/or rightward) is meant for explanation purposes only and should not limit the present disclosure from operating in a similar fashion in any other direction.

In some embodiments, the force applied by the one or more assist devices 120 to the barrier 200 may be less than the force required to lift (e.g., move to a closed position) the barrier 200. Similarly, the force applied by the drive system 300 to the barrier 200 may be less than the force required to lift the barrier 200. In some embodiments, the force applied by the assist device 120 in combination with the force applied by the drive system 300 may be greater than the force required to the lift the barrier 200. In this way, the force applied by the drive system 300 and the force applied by the assist device 120 may be at least enough to cause the barrier 200 to move. For instance, and by way of non-limiting example, if the barrier 200 requires a specific force to move that is greater than the drive system 300 provides, the force the assist device 120 applies in combination with the drive system 300 may be enough to cause the barrier 200 to move. Similarly, if the barrier 200 requires a force that is greater than the assist device 120 provides, the force the drive system 300 applies to the barrier in combination with the assist device 120 may be enough to cause the barrier 200 to move.

In some embodiments, the assist device 120 may apply a force greater than is required to move the barrier 200. In some embodiments, the assist device 120 may be configured to apply only a portion of the total potential force of the assist device 120. For instance, if the assist device 120 is capable of applying a force that moves the barrier 200, the assist device 120 may be configured to reduce the amount of force applied on the barrier 200. This configuration, for example, may take into consideration the force the drive system 300 applies on the barrier 200. In this way, the assist device 120 may be tuned (e.g., optimized, configured, or the like) to apply a force while considering the force the drive system 300 applies. In some embodiments, the tuning of the assist device 120 may be a static configuration, wherein the assist device 120 is tuned during installation of the assist device into the barrier assist system 100. In some embodiments, the tuning of the assist device 120 may be a dynamic configuration, wherein the assist device 120 may tune (e.g., configure, optimize, reconfigure, or the like) the amount force applied on the barrier 200 during operation, and for each operation. In this way, the assist device 120 may react, via the tuning, to the force the drive system 300 applies on the barrier 200. For instance, if the drive system 300 applies a lesser force during a closing operation of the barrier 200, the assist device 120 may reconfigure the force it applies on the barrier 200 to compensate for the lower force of the drive system 300.

In some embodiments, the assist device 120 may be configured to apply an override function, wherein the override function includes a force that overrides the force the drive system 300 applies on the barrier 200. For instance, if a vehicle that has a barrier assist system 100 installed experiences a loss of function (e.g., an unexpected loss of power, function, movement, capability, and/or the like), which subsequently affects the drive system 300, the assist device 120 may cause the barrier 200 to be raised into a closed position. For instance, the assist device 120 may be configured to constantly apply a closing force on the barrier 200 and the drive system 300 may apply a counteracting force to lower the barrier 200. In another instance, the assist device 120 may be configured to apply the override function when the vehicle experiences a loss of function. In some embodiments, the override function may include an override to close the barrier 200 or to open the barrier 200.

In some embodiments, reducing an opening speed, reducing an opening acceleration, and/or increasing an opening resistance may include slowing down the barrier 200 as it is being lowered (e.g., opened). In some embodiments, the barrier 200 may be opened due to gravity, the conventional drive system (e.g., drive system 300), and/or the like. In some embodiments, the barrier assist system 100 may be configured to reduce the load (e.g., force) the barrier 200 applies on the drive system 300. For instance, and by way of non-limiting example, the barrier assist system 100 may be configured to reduce the load on the drive system 300 by an amount which is the difference between the barrier 200 and a standard window. For instance, if a standard window applies a load L, and the barrier 200 applies a load L1 where L1 is greater than L, the barrier assist system 100 may be configured to reduce the load on the drive system 300 at least by L1 less L.

In some embodiments, the barrier assist system 100 may be configured to increase the force on the barrier 200. For example, the barrier assist system 100 may be configured to increase a closing speed, increase a closing acceleration, and/or reduce a closing resistance. In some embodiments, increasing the force on the barrier 200 for closing may include supplementing the force the drive system 300 applies on the barrier 200, reducing the force the drive system 300 applies to the barrier during closing, and/or the like. In this way, the barrier assist system 100 may be configured to reduce a closing force at which the drive system 300 is configured to close the barrier 200. For instance, if a standard window requires a force F to close and the barrier 200 requires a force F1 to close, where F1 is greater than F, the barrier assist system 100 may be configured to apply at least a force of F1 less F on the barrier 200.

In some embodiments, the barrier assist system 100 may include one or more assist devices 120. The assist device 120 may be any type of device or system that applies a force on the barrier 200. For example, the assist device may utilize any type of force device (e.g., a spring-loaded pully, a spring, a pully and counterweight system, a scissor lift, a magnetic system, an electromagnetic system, an actuator, a motor, and/or the like) that provides additional force. In some embodiments, the assist device 120 may include a rotational member 121, a flexible member 122, and/or the like. The rotational members 121 may include the force device to provide the additional force. For example, in particular embodiments, the rotational members 121 may use a spring-loaded pully such that during opening of the barrier 200, the spring-loaded pully uses the increased weight of the improved barrier 200 (described in further detail below), to load the spring (e.g., compress the spring) within the pully using the weight of the barrier 200. The loading of the spring provides two benefits, it reduces the speed at which the barrier 200 opens, and loads the spring such that during closing, the spring provides a counter force to the barrier 200 (e.g., by aiding in winding the flexible wire) to aid the drive system 300 in closing the barrier 200 (e.g., the combination of the drive system 300 and the release of the load in the spring aid in closing the barrier).

In some embodiments, the assist device 120 may be operatively coupled to the drive system 300. The assist device 120 may include an electromagnetic system, an actuator, a motor, a drive system, and/or the like. In this way, the assist device 120 may be operatively coupled to the drive system 300 (e.g., conventional drive system) and may operate when the drive system 300 is operated. As such, the barrier assist system 100 may receive a signal from a controller (e.g., wired, wireless, or the like signal) to operate from the drive system 300. In this way, the barrier assist system 100 may cause the assist device(s) 120 to operate in a way that supplements the operation of the drive system 300.

In some embodiments, the barrier assist system 100 may include one, two, three, four, five, six, seven, eight, nine, ten, and/or the like, assist devices 120. As such, in some configurations the one or more assist devices 120 may include a first assist device and a second assist device. Using at least two assist devices 120, such as the first assist device 120 and the second assist device 120, may allow for more even movement of the barrier 200. For example, the first assist device 120 and the second assist device 120 may be configured to reduce binding of the barrier 200 within the frame 400 during movement of the barrier. As used herein, "bind" may include immobilize, jam, lock, restrain, obstruct, and/or the like. For instance, and by way of non-limiting example, the first assist device 120 and the second assist device 120 may be configured to reduce jamming of the barrier 200 when the barrier 200 is opened. In some embodiments, the assist devices 120 may be strategically positioned to restrict binding of the barrier 200. In this way, the assist devices 120 may apply a force in such a way as to restrict (e.g., reduce, prevent, or the like) binding of the barrier 200 in the frame 400. For example, using at least two assist devices 120 aids in restricting binding of the barrier 200 by moving both sides the barrier 200 at the same or similar time so that one side of the barrier 200 does not drop or raise more quickly than the other side of the barrier 200.

In some embodiments, the assist devices 120 may be configured to apply different amounts of force on the barrier 200. For instance, and by way of non-limiting example, if there are two assist devices in the barrier assist system 100, each of the assist devices may be configured to apply a different force. For example, should one side of the barrier 200 weigh more than another side of the barrier 200, multiple assist devices may apply different forces to account for the weight distribution in the barrier 200. In some embodiments, the assist devices 120 may individually apply, or collectively apply, a force of 2, 4, 6, 8, 10, 12, 14, 16, 18, 20, 22, 24, 26, 28, 30, or the like pounds of force (or apply a force that ranges between, overlaps, or falls outside of any of these values).

As illustrated at least in in FIGS. 2, 4, and 6-9 one or more guides 500 may be used to within the one or more assist devices 200. As such, in some embodiments, the one or more assist devices 120 may include the flexible member 122 being operatively coupled to the one or more guides 500, wherein the guides 500 are operatively coupled to the frame 400. The guides 500 may be used to allow the flexible members 122 to be connected to the barrier 200 (directly or through the use of the support members 110) and not interfere with the other components within the door of the vehicle. Moreover, since different vehicles have different configurations, the guides 500 may be movable to different positions on the frame 400 in order to reposition the location of the flexible members 122. As will be discussed further herein, like the guides 500, the one or more rotational members 121 may also be movable to different positions on the frame 400 in order to account for different configurations within different vehicles.

The rotational members 121, the flexible members 122, and/or the guides 500 may be configured to aid in moving the barrier 200. For example, the flexible member 122 may be configured to be unwound from the rotational member 121 when the barrier 200 is lowered (e.g., opened). In some embodiments, the flexible member 122 may be configured to be wound around the rotational member 121 when the barrier 200 is raised (e.g., closed).

As used herein, "wound" may encompass a variety of definitions, such as wrap, coil, roll, reel, encircle, spiral, loop, and/or the like. For instance, and by way of non-limiting example, the flexible member 122 may be wrapped around the rotational member 121 when the barrier 200 is raised. As used herein, "raised" may include lifted, elevated, heightened, hoisted, rolled up, and/or the like. As used herein, "lowered" may include let down, dropped, rolled down, and/or the like.

In some embodiments, the rotational member 121 may include a spring-loaded pully. In some embodiments, the spring-loaded pully may apply a constant force to the barrier 200. The rotational member 121 applying a constant force to the barrier 200 during operation may supplement the force the drive system 300 applies to the barrier. As mentioned previously, and in different configurations, the rotational member 121 may dynamically adjust force applied to the barrier 200. Dynamically adjusting the force may include a consideration of the force applied by the drive system 300.

In some embodiments, the flexible member 122 may include a structure that transfers a force or moves a force along a line of action. The flexible member 122 may include a wire, cable, chain, string, rope, thread, band, and/or the like. In particular embodiments, the flexible member 122 may include a wire.

In some embodiments, the flexible member 122 may include a structure that elongates when a force is applied to it. In this way, the flexible member 122 may include a material that elongates when a force is applied and returns to its original length when the force is removed. For instance, and by way of non-limiting example, the flexible member 122 may include a structure that stretches during movement of the barrier 200.

As previously discussed herein the barrier 200 may be any type of barrier that provides physical separation and protection between multiple areas. For instance, the barrier 200 may be physically separating the inside of a vehicle with the outside of the vehicle. In this way, the barrier 200 may include a window of the vehicle. In some embodiments, the barrier 200 may be a window, wherein the window and a window frame (e.g., similar to the frame 400) are operatively coupled to the vehicle. In some embodiments, the barrier 200 may include a front driver door, a front passenger door, a rear driver door, a rear passenger door, a rear truck door, a rear sliding window, an overhead sliding window, and/or the like.

In some embodiments, the barrier 200 may include one or more types of materials. For instance, the barrier 200 may include composite materials, components, and/or the like. In some embodiments, the barrier 200 may include transparent, translucent, opaque, or a combination thereof, material. In some embodiments, the barrier 200 may be configured to provide various Underwriters Laboratories (UL) level protection from projectiles, wherein the projectiles may include projectiles from storms, firearms, explosions, testing, debris, shrapnel, particles, and/or the like. As such, the barrier assist system 100 may provide desired protection from storms, forced entries, projectiles, bullets, explosions, debris, shrapnel, and/or the like in a customizable way. In this way, the barrier assist system 100 may include a customizable barrier 200, wherein the barrier 200 is rated to protect against such projectiles. It should be understood, that the barrier assist system 100 of the present invention may be installed when manufacturing a vehicle that provides a barrier with protection from projectiles; however, in particular embodiments the barrier assist system 100 may be installed when retrofitting a vehicle with an improved barrier 200 that provides projectile resistance.

In some embodiments, the barrier assist system 100 may provide resistance to such projectiles in accordance with UL standards, National Institute of Justice (NIJ) standards, the American Society for Testing and Materials (ASTM) standards, and/or the like, at the time of filing this application or any updates thereto. In some embodiments, the barrier 200 may include a UL level 1, 2, 3, 4, 5, 6, 7, 8, 9, 10, or the like, rating. In some embodiments, the barrier 200 may be a forced entry or blast resistant window to provide at least UL level 1 protection from projectiles, and wherein the drive system 300 (e.g., conventional drive system) is unable to close the barrier 200 without the aid of the barrier assist system 100. For example, a barrier of UL level 1 protection may be too heavy for the drive system 300 to move on its own. Similarly, a drive system 300 may become inoperable after a certain number of operations of moving a UL level rated barrier on its own.

In some embodiments, the support member 110 may include specific barrier support members 111. In this way, if the support member 110 was configured for an original barrier, it may be configured (e.g., re-configured, or the like) to a specific barrier support member that is configured (e.g., re-configured) for use with an improved barrier 200. In some embodiments, the barrier support member 111 may be operatively coupled to the barrier 200. In some embodiments, the barrier support member 111 may include brackets, holders, nuts, bolts, screws, fasteners, and/or the like that allow for operative coupling with the barrier 200.

In some embodiments, the support member 110 may change in response to the barrier 200, wherein the barrier 200 may be altered based on the UL rating, NIJ standards, ASTM standards, and/or the like. In this way, if the barrier 200 is reconfigured to a barrier 200 with a higher UL rating, the support member 110 may also be reconfigured to accommodate the higher UL rated barrier 200. For instance, a high UL rated barrier may include a larger thickness of the barrier, which may cause the support member 110 to dimensionally change to accommodate the increased thickness of the barrier.

In some embodiments, the support member 110 may change in response to the type of vehicle in which the barrier assist system 100 is installed. Further, in some embodiments, the support member 110 may change in response to the components in the vehicle door, the space available within the vehicle door panel, and/or the like.

The barrier assist system 100 may also accommodate changes of barriers after initial installation of the barrier 200. A change in a barrier 200 may occur after a standard window has been installed and a UL rated barrier is now required, after a barrier becomes damaged or inoperable, after a determination that a higher UL rated barrier is required, and/or the like. In this way, new or different barriers may be installed into the barrier assist system 100 to accommodate a change in functionality.

In some embodiments, the barrier support member 111 may be configured to support an entire edge of the barrier 200. In some embodiments, the barrier support member 111 may be configured to support specified portions of the barrier 200. In some embodiments, the barrier support member 111 may be configured in different ways throughout the vehicle in response to where the barrier assist system 100 is installed within the vehicle. For instance, and by way of non-limiting example, the barrier support member 111 may change in response to the barrier assist system 100 being installed in the front driver door, the front passenger door, the rear driver door, the rear passenger door, the rear truck door, the rear sliding window, the overhead sliding window, and/or the like.

The drive system 300 may be configured to open and close an original barrier, wherein the barrier assist system 100 is configured to aid in the opening or the closing of a different barrier 200 that provides improved protection. In some embodiments, the barrier assist system 100 may be configured to open and close the barrier 200 at the same rate as a conventional drive system 300 is configured to open and close an original barrier (e.g., a conventional standard window).

In some embodiments, the drive system 300 may include a motor configured to open a standard window. In some embodiments, the standard window may be supplied by the original equipment manufacturer (OEM) of the vehicle. Moreover, the drive system 300, and thus the motor therein, may be supplied by the OEM. In some embodiments, the drive system 300 may include configurations originally configured by the OEM to open a standard window. As such, the drive system 300 may not apply enough force on its own to move an improved barrier 200 (e.g., that is likely heavier). In some embodiments, the barrier assist system 100 may supplement, augment, boost, amplify, support, and/or the like the drive system 300 to aid in allowing the barrier 200 to move. In this way, the barrier assist system 100 may create an additional force that, when coupled with the force provided by the drive system 300, may cause the barrier 200 to move.

In some embodiments, the barrier assist system 100 may be installed on a vehicle that uses a conventional drive system (e.g., drive system 300). In some embodiments, the barrier assist system 100 may not require any changes to the vehicle's controller (e.g., processors, computer software, actuators, computer chips, electronic systems, and/or the like). In some embodiments, the barrier assist system 100 may be configured to be installed on an existing OEM window system while maintaining the OEM drive system 300. For instance, and by way of non-limiting example, the drive system 300 may operate as if the barrier 200 (e.g., a non-standard window, a UL rated barrier, and/or the like), which may be heavier than a standard window, is a standard window. Further, in some embodiments, the drive system 300 may operate as if the barrier assist system 100 is not installed. In this way, the drive system 300 may operate with the configurations supplied by the OEM in combination with the barrier assist system 100 to move the barrier 200. For instance, if a user operates the drive system 300 to maneuver a standard window, the user may operate the drive system 300 in the same manner to cause the barrier assist system 100 to move a barrier 200. That is, in some embodiments the conventional drive system 300 operates as originally programmed without having to change any operational parameters (e.g., the conventional drive system 300 and processors of the vehicle are not aware that the improved barrier 200 and/or barrier assist system 100 is installed).

Additionally, or alternatively, the motor of the drive system 300 may be reconfigured to operate with the barrier assist system 100. For instance, and by way of non-limiting example, the motor of the drive system 300 may be reconfigured to accommodate barrier 200 (e.g., a heavier window, a window with UL level protection, and/or the like). In some embodiments, reconfiguring the motor of the drive system 300 may include increasing the output force of the motor by way of alteration of the existing motor, integration of a different motor, addition of a subsequent motor, and/or the like. In another instance, and by way of non-limiting example, the vehicle controller may be reconfigured to accommodate the barrier 200.

In some embodiments, the drive system 300 may include a manual drive system. In some embodiments, the manual drive system may include a manually activated crank, or the like, to move the barrier 200.

In some embodiments, the frame 400 may include a vehicle door frame, an additional frame added to the vehicle door frame, and/or the like. In some embodiments, the vehicle door frame may include connection points where the barrier assist system 100 may be operatively coupled to the vehicle door frame. In some embodiments, the barrier assist system 100 may take advantage of existing structures, fixtures, components, and/or the like of the vehicle door frame during coupling of the barrier assist system 100 to the frame 400.

In some embodiments, the additional frame added to the vehicle door frame may include a structure that supports the barrier assist system 100 and allows the barrier assist system 100 to be operatively coupled to the vehicle door frame. In this way, the barrier assist system 100 may include a frame 400 of its own that couples to the vehicle door frame.

In some embodiments, the frame 400 may be reconfigured with respect to its form, structure, layout, and/or the like between each of the barriers that the barrier assist system 100 aids in moving. In this way, the frame 400 may adapt to the front driver door, the front passenger door, the rear drive door, the rear passenger door, the rear trunk door, the rear sliding window, and/or the like. For instance, and by way of non-limiting example, the frame 400 of the front driver door may have a different layout than the frame 400 of the front passenger door, which allows for the barrier assist system 100 to accommodate for the variations within a vehicle and/or between vehicles. Additionally, or alternatively, the frames 400 may include different locations with which the barrier assist system 100 and/or the components thereof (e.g., rotational members 121, guides 500, or the like) may be attached in order to account for different configurations within different vehicle doors within the same vehicle or within different vehicles.

In some embodiments, the guide 500 may include a rotational guide, a static guide, a dynamic guide, a track, and/or the like. In some embodiments, the one or more guides 500 may include a rotational guide member. The guide 500 may be operatively coupled to any static component (e.g., vehicle door, frame 400, or the like) relative to the barrier 200. In some embodiments, the guide 500 may be operatively coupled to the frame 400. There may be any number of guides for each assist device 120. In some embodiments, there may be one, two, three, four, five, six, seven, eight, nine, or ten guides 500 for each assist device 120.

In some embodiments, the guide 500 may provide alignment of the flexible member 122 while the barrier 200 is raised or lowered. In this way, the flexible member 122 may lay in the guide 500 to ensure the flexible member 122 provides the requisite transfer of force to move the barrier 200.

In some embodiments, the rotational guide may include a guide that may rotate when the flexible member 122 moves across the guide 500. In this way, as the flexible member 122 is wound and/or unwound from the assist device 120, the rotational guide may rotate along with the flexible member 122. The rotational guide may reduce frictional forces associated with the flexible member 122 contacting the guide 500, which may allow for the barrier assist system 100 to aid in moving the barrier 200 with a higher efficiency.

Figure 16:
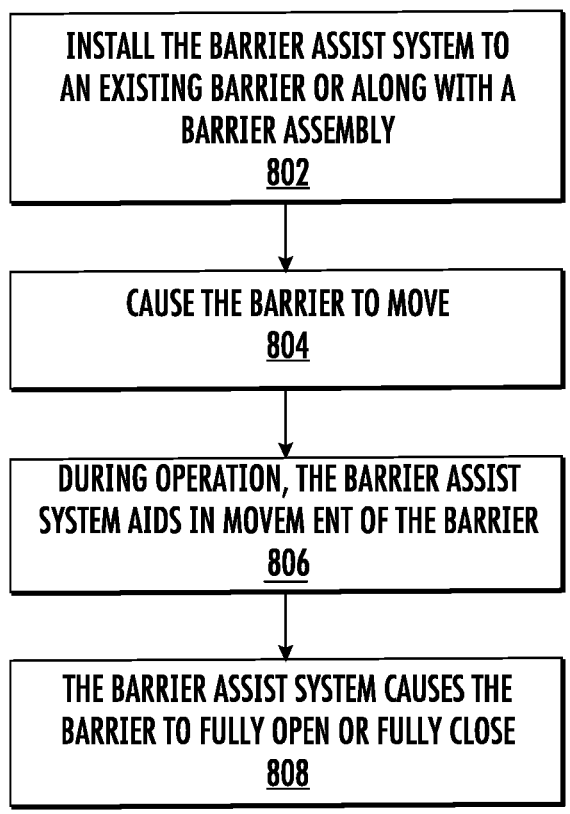
FIG. 16 illustrates a process for moving (e.g., opening, closing, or the like) the barrier using the barrier assist system, in accordance with some embodiments of the present disclosure.
Figure 19:
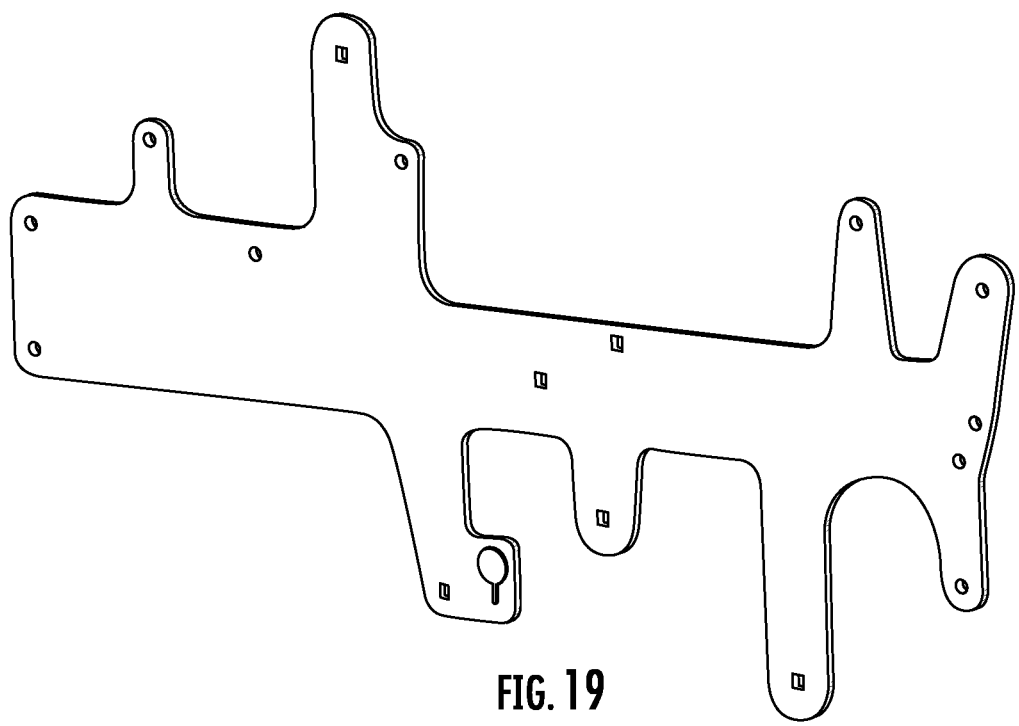
FIG. 19 is a perspective view of a front frame, in accordance with some embodiments of the present disclosure.
Figure 20:
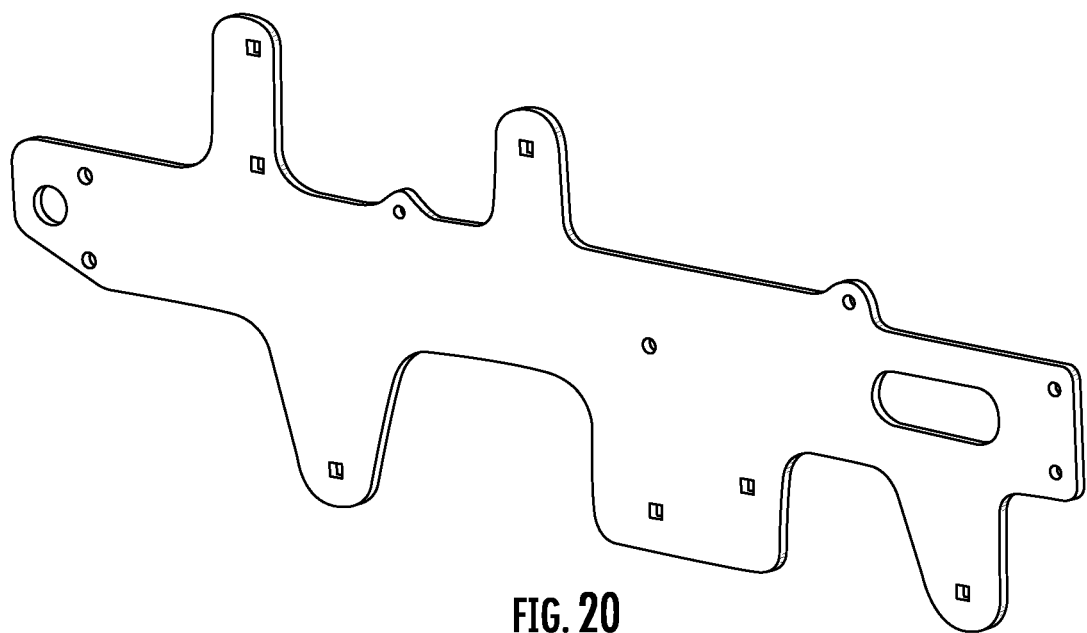
FIG. 20 is a perspective view of a rear frame, in accordance with some embodiments of the present disclosure.
Figure 21:
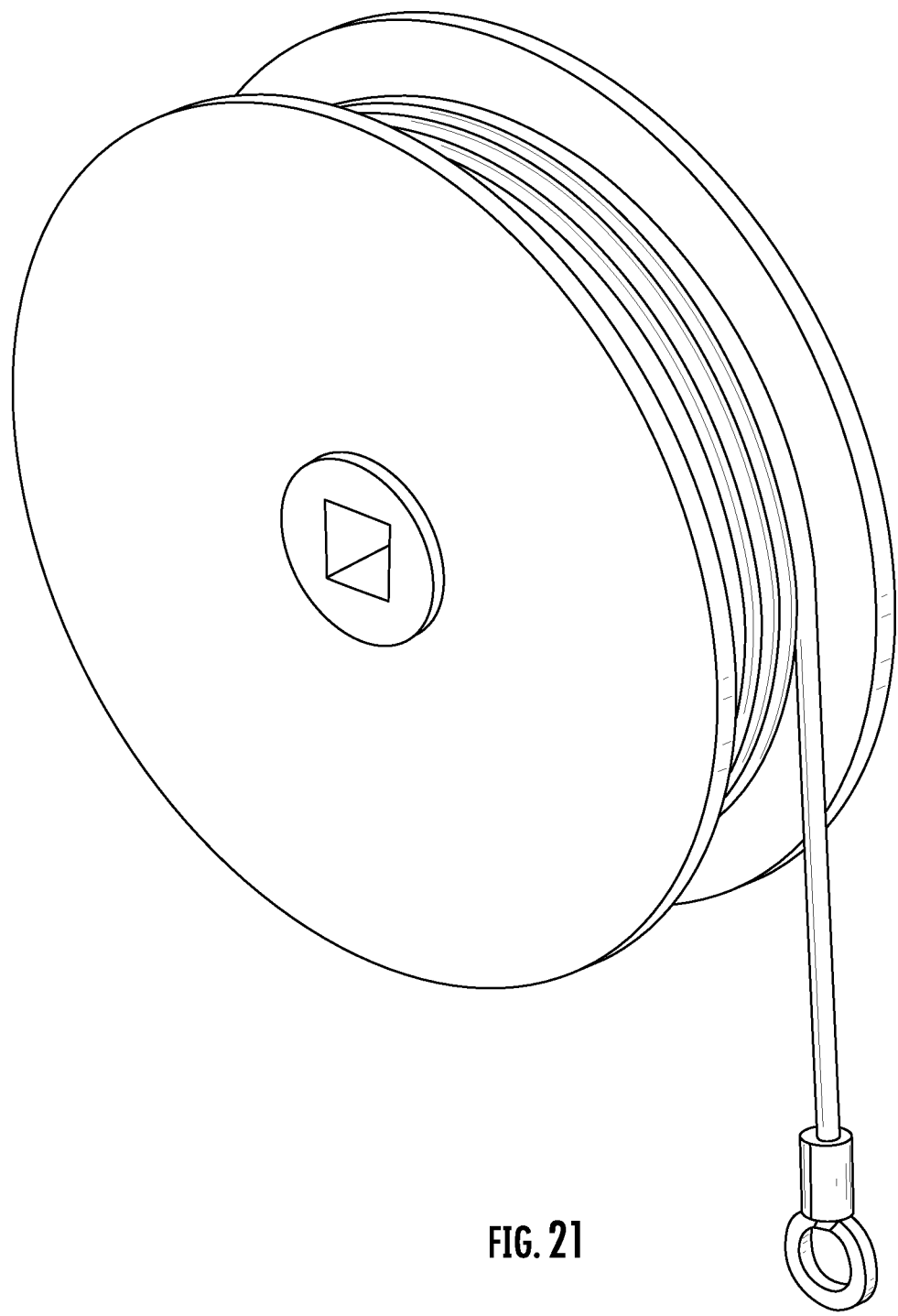
FIG. 21 is a perspective view of an assist device, in accordance with some embodiments of the present disclosure.
Figure 22:
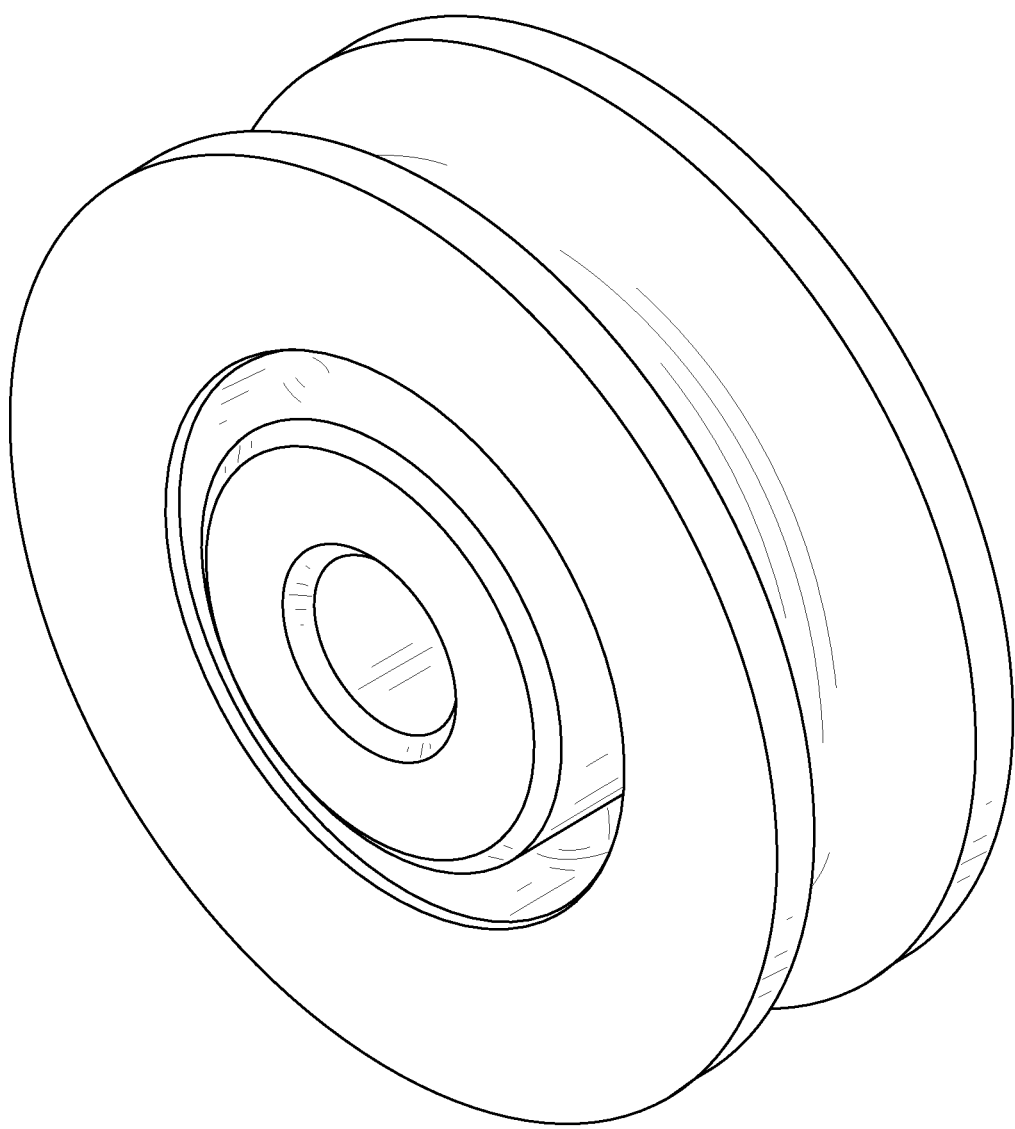
FIG. 22 is a perspective view of a guide, in accordance with some embodiments of the present disclosure.
Figure 23:
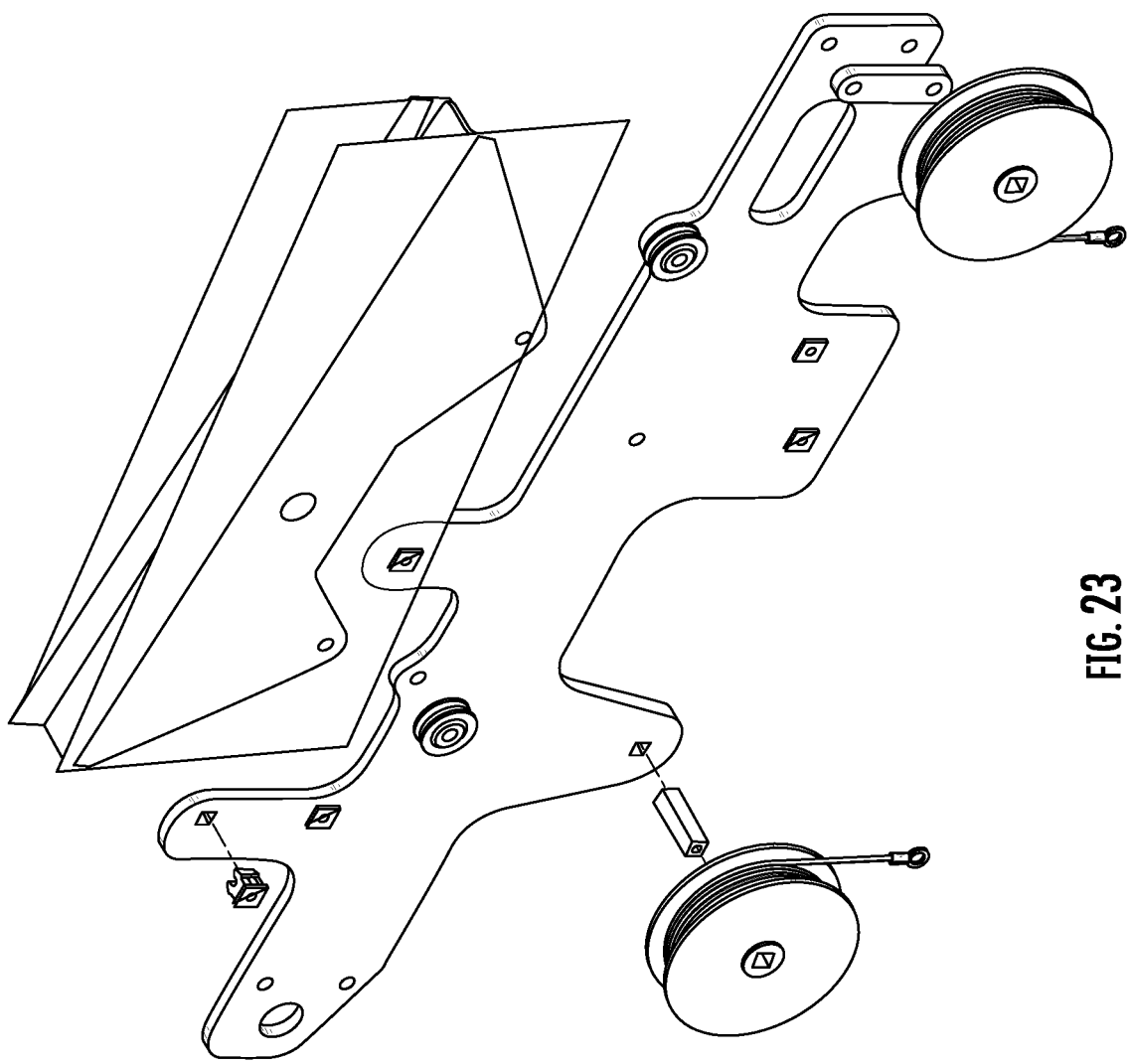
FIG. 23 is an exploded view of a rear barrier assist system as an assembly, in accordance with some embodiments of the present disclosure.
Figure 24:
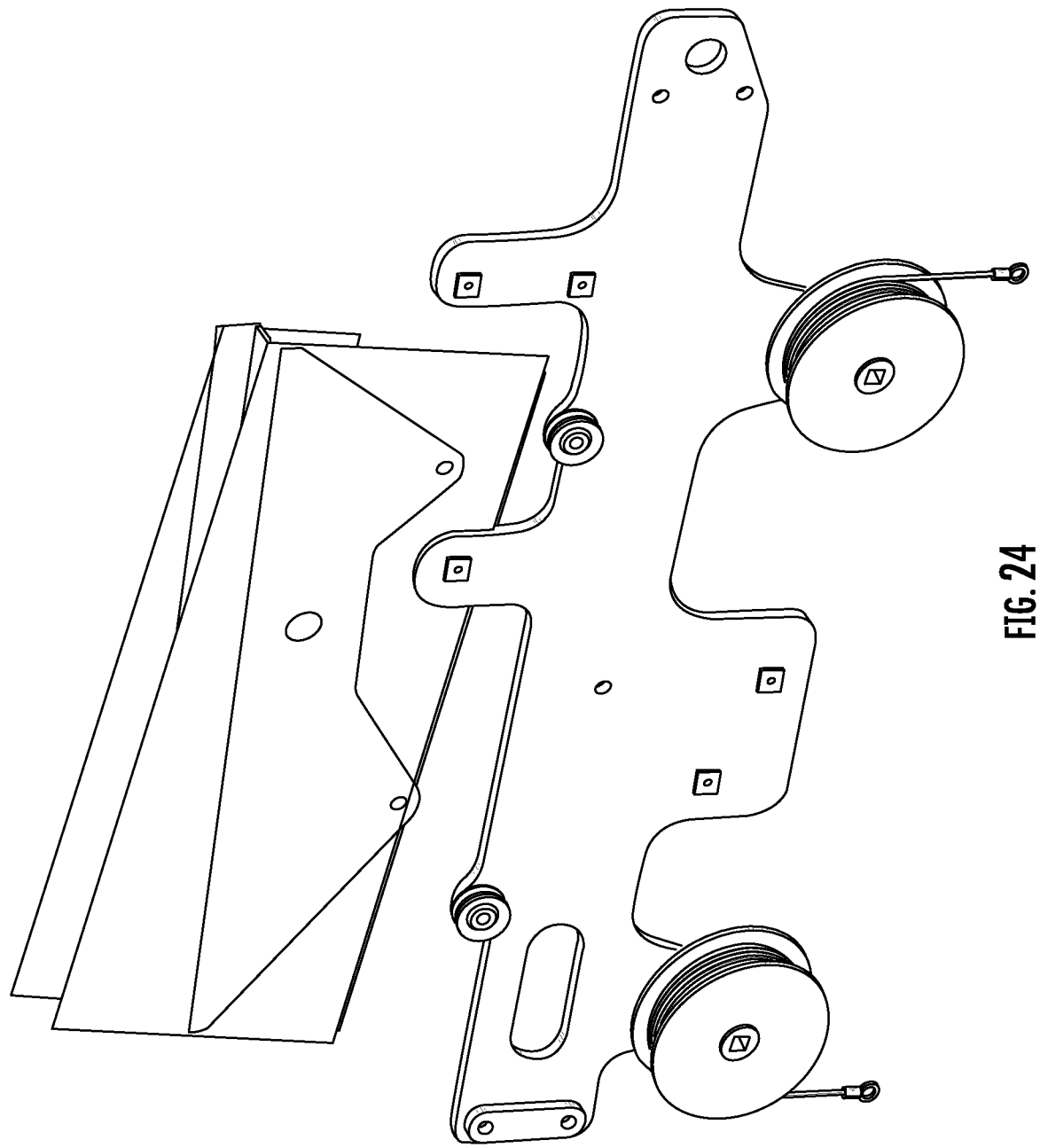
FIG. 24 is a perspective view of a rear barrier assist system as an assembly, in accordance with some embodiments of the present disclosure.
Figure 25:
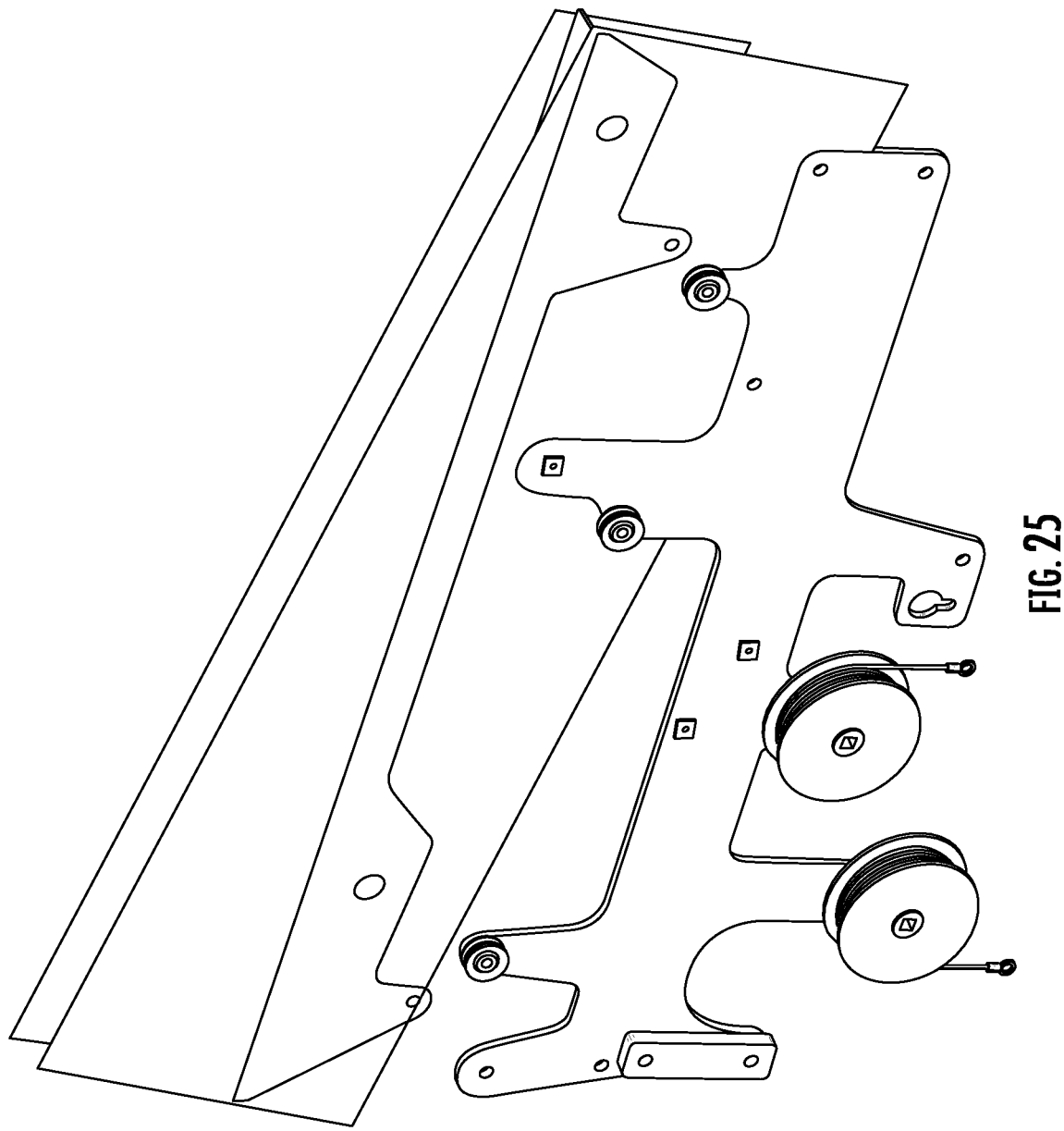
FIG. 25 is a perspective view of a front barrier assist system as an assembly, in accordance with some embodiments of the present disclosure.

FIG. 16 illustrates a process flow 800 for a method of opening and closing the barrier using the barrier assist system 100. As illustrated by block 802 of FIG. 16, a user (e.g., installer, or the like) may install the barrier assist system 100 to an existing barrier 200 (e.g., a barrier already installed in a vehicle), or along with a barrier assembly (e.g., during initial installation of the barrier in a vehicle).

In some embodiments, installing the barrier assist system 100 to an existing barrier 200 may include configuring and/or reconfiguring the barrier assist system 100 to aid in moving the barrier 200. In this way, the barrier assist system 100 may be installed in such a way as to assist the drive system 300 that is already installed in the vehicle. In some embodiments, the drive system 300 may have been installed by the OEM of the vehicle, by an after-market installer, by the installer who installed the barrier 200, by the installer of the barrier assist system 100, and/or the like. In this way, the barrier assist system 100 may be configured to any existing drive system 300. In some embodiments, the drive system 300 may include a motor driven system, and actuator system, a manual system, and/or the like to move the barrier.

Block 804 of FIG. 16 further illustrates that the barrier 200 is caused to move. In some embodiments, a user may cause the barrier 200 to move. In some embodiments, the barrier 200 may be moved in any direction. In some embodiments, the barrier 200 may be lowered or raised. In some embodiments, the user may cause the barrier 200 to move through the drive system 300. In some embodiments, the user may cause the barrier 200 to move through manual intervention (e.g., a manual crank that controls movement of the barrier, through the user pushing on the barrier, and/or the like).

In some embodiments, the user may initiate causing the barrier 200 to move through the drive system 300. In this way, the user may cause the barrier 200 to move similar to how the user would cause a standard window to be moved. For instance, and by way of non-limiting example, the user may activate the drive system 300 to move the barrier 200, wherein the drive system 300 may be aided by the barrier assist system 100. Further, in some embodiments, the user may not have to separately activate the barrier assist system 100 for it to aid in moving the barrier 200.

Block 806 of FIG. 16 further illustrates that, during operation, the barrier assist system 100 aids in movement of the barrier 200. In some embodiments, the barrier assist system may aid in movement of the barrier 200 during the entire time the barrier 200 is moving. In some embodiments, the barrier assist system 100 may aid in certain portions relative to the position of the barrier 200. For instance, and by way of non-limiting example, the barrier assist system 100 may be configured to aid in the closing of the barrier 200 at the instance where the barrier 200 is at its lowest point. In some embodiments, the barrier assist system 100 may be configured to aid in the movement of the barrier in only one direction (e.g., only when the barrier is being raised or only when the barrier is being lowered).

Block 808 of FIG. 16 further illustrates that the barrier assist system 100 causes the barrier 200 to fully open or fully close. As used herein, "fully" may encompass a variety of definitions. For example, fully may include completely, entirely, wholly, totally, and/or the like. For instance, and by way of non-limiting example, the barrier assist system 100 may cause the barrier 200 to be completely lowered. In this way, the barrier assist system 100 may aid the drive system 300 in moving the barrier 200 during the complete motion of the barrier 200.

In some embodiments, the barrier assist system 100 may cause the barrier 200 to be partially opened or closed. In some embodiments, the barrier 200 may be partially opened or closed in response to the user operating the drive system 300. In this way, the barrier assist system 100 may aid the drive system 300 to move the barrier 200 to the user's desired position. For instance, and by way of non-limiting example, if the user wishes the barrier 200 to be half opened, the user may operate the drive system 300 to move the barrier 200 to a half opened position, and, in response, the barrier assist system 100 may aid in moving the barrier to the half opened position. In this way, the barrier assist system 100 may not independently, individually, autonomously, and/or the like, adjust the position of the barrier 200, but may only aid in moving the barrier 200 in combination with the drive system 300.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A barrier assist system configured to aid in moving a barrier, the barrier assist system comprising:
   one or more support members configured to be operatively coupled to the barrier;
   at least two assist devices configured to be operatively coupled to the one or more support members and a frame,
   wherein each of the at least two assist devices comprise:
     a rotational member, wherein the rotational member comprises a spring-loaded pully;
     a flexible member operatively coupled to the rotational member and operatively coupled to the one or more support members; and
   wherein a drive system is configured to open and close the barrier;
   wherein the barrier assist system is configured to aid the drive system in opening or closing of the barrier within the frame; and
   wherein when the barrier is opening, the spring-loaded pully provides a counter force while the spring-loaded pully is loaded at least in part by the weight of the barrier reducing the opening speed of the barrier, and wherein when the barrier is closing, the spring-loaded pully provides an additional force to the barrier to aid the drive system during closing of the barrier; and
   wherein the flexible member is configured to be unwound from the rotational member when the barrier is opened, and wherein the flexible member is configured to be wound around the rotational member when the barrier is closed.

2. The barrier assist system of claim 1, wherein the barrier assist system is configured to reduce an opening speed, reduce an opening acceleration, or increase an opening resistance of the barrier, and is configured to reduce a closing force at which the drive system is configured to close the barrier.

3. The barrier assist system of claim 1, wherein the flexible member comprises a wire.

4. The barrier assist system of claim 1, wherein each of the at least two assist devices further comprise:
   one or more guides configured to be operatively coupled to the frame, wherein the flexible member is configured to be operatively coupled to one or more guides.

5. The barrier assist system of claim 4, wherein the one or more guides comprises a rotational guide member.

6. The barrier assist system of claim 1, wherein each of the at least two assist devices comprise:
   a first assist device;
   a second assist device; and
   wherein the first assist device and the second assist device are configured to aid in reducing binding of the barrier within the frame during opening and closing.

7. The barrier assist system of claim 1, wherein the barrier is a window, and wherein the window and the frame are within a vehicle.

8. The barrier assist system of claim 7, wherein the drive system is a motor configured to open a standard window.

9. The barrier assist system of claim 7, wherein the one or more support members comprise:
   a barrier support member, wherein the barrier support member is operatively coupled to the window.

10. The barrier assist system of claim 7, wherein the window is a forced entry or blast resistant window configured to provide at least UL level 1 protection or greater, and wherein the drive system alone is unable to close the window without the barrier assist system.

11. A vehicle barrier system comprising:
    a barrier;
    a frame, wherein the barrier is configured to open and close within the frame;
    a drive system operatively coupled to the frame and the barrier and configured to open and close the barrier; and
    one or more barrier assist systems operatively coupled to the barrier and the frame, and configured to aid the drive system in opening or closing of the barrier within the frame;
    wherein a barrier assist system of the one or more barrier assist systems comprise:
      one or more support members operatively coupled to the barrier;
      at least two assist devices operatively coupled to the one or more support members and the frame; and
      wherein each of the at least two assist devices comprise:
        a rotational member, wherein the rotational member comprises a spring-loaded pully;
        a flexible member operatively coupled to the rotational member and operatively coupled to the one or more support members; and
        wherein when the barrier is opening, the spring-loaded pully provides a counter force while the spring-loaded pully is loaded at least in part by the weight of the barrier reducing the opening speed of the barrier, and wherein when the barrier is closing, the spring-loaded pully provides an additional force to the barrier to aid the drive system during closing of the barrier; and
        wherein the flexible member is configured to be unwound from the rotational member when the barrier is opened, and wherein the flexible member is configured to be wound around the rotational member when the barrier is closed.

12. The vehicle barrier system of claim 11, wherein the flexible member comprises a wire.

13. The vehicle barrier system of claim 11, wherein each of the at least two assist devices comprise:
- a first assist device;
- a second assist device; and
- wherein the first assist device and the second assist device are configured to aid in reducing binding of the barrier within the frame during opening and closing.

14. The vehicle barrier system of claim 11, wherein the barrier is a window, and wherein the window is a forced entry or blast resistant window configured to provide at least UL level 1 protection or greater, and wherein the drive system alone is unable to close the window without the barrier assist system.

15. The vehicle barrier system of claim 11, wherein the one or more barrier assist systems are configured to reduce an opening speed, reduce an opening acceleration, or increase an opening resistance of the barrier, and is configured to reduce a closing force at which the drive system is configured to close the barrier.

16. A method of opening and closing a barrier using at least two assist devices comprising:
- a rotational member, wherein the rotational member comprises a spring-loaded pully; and
- a flexible member operatively coupled to the rotational member and operatively coupled to the one or more support members;

the method comprising:
- opening the barrier using a drive system operatively coupled to a frame and the barrier, wherein each of the at least two assist devices reduce an opening speed, reduce an opening acceleration, or increase an opening resistance of the barrier, wherein when the barrier is opening, the spring-loaded pully provides a counter force while the spring-loaded pully is loaded at least in part by the weight of the barrier reducing the opening speed of the barrier, and wherein the flexible member is configured to unwound from the rotational member when the barrier is opened; and
- closing the barrier using the drive system, wherein each of the at least two assist devices reduce a closing force at which the drive system is configured to close the barrier, wherein when the barrier is closing, the spring-loaded pully provides an additional force to the barrier to aid the drive system during closing of the barrier, and wherein the flexible member is configured to be wound around the rotational member when the barrier is closed.

* * * * *